United States Patent
Yamamoto

(10) Patent No.: US 10,521,131 B2
(45) Date of Patent: Dec. 31, 2019

(54) STORAGE APPARATUS AND STORAGE CONTROL APPARATUS

(71) Applicant: FUJITSU LIMITED, Kawasaki-shi, Kanagawa (JP)

(72) Inventor: Kazuhiko Yamamoto, Inagi (JP)

(73) Assignee: FUJITSU LIMITED, Kawasaki (JP)

( * ) Notice: Subject to any disclaimer, the term of this patent is extended or adjusted under 35 U.S.C. 154(b) by 75 days.

(21) Appl. No.: 15/679,404

(22) Filed: Aug. 17, 2017

(65) Prior Publication Data
US 2018/0067660 A1    Mar. 8, 2018

(30) Foreign Application Priority Data
Sep. 7, 2016   (JP) .................................. 2016-174473

(51) Int. Cl.
*G06F 3/06*    (2006.01)

(52) U.S. Cl.
CPC .......... *G06F 3/0616* (2013.01); *G06F 3/0635* (2013.01); *G06F 3/0641* (2013.01); *G06F 3/0688* (2013.01)

(58) Field of Classification Search
CPC ...... G06F 3/0616; G06F 3/0635; G06F 3/064; G06F 3/0641; G06F 3/0647; G06F 3/0688
USPC ................ 711/103, 156, 165, 170
See application file for complete search history.

(56) References Cited

U.S. PATENT DOCUMENTS

| | | | |
|---|---|---|---|
| 7,353,324 B2 | 4/2008 | Tanaka | |
| 8,874,835 B1 * | 10/2014 | Davis | G06F 3/0679 |
| | | | 711/103 |
| 9,298,386 B2 * | 3/2016 | Baldwin | G06F 3/0641 |
| 2005/0068802 A1 | 3/2005 | Tanaka | |
| 2013/0151756 A1 * | 6/2013 | Tofano | G06F 3/0608 |
| | | | 711/103 |
| 2015/0199268 A1 * | 7/2015 | Davis | G06F 12/0246 |
| | | | 711/103 |
| 2015/0293713 A1 | 10/2015 | Seo et al. | |

FOREIGN PATENT DOCUMENTS

| | | |
|---|---|---|
| JP | 2005-108304 | 4/2005 |
| JP | 2015-201050 | 11/2015 |
| JP | 2015-204118 | 11/2015 |

* cited by examiner

*Primary Examiner* — Gary J Portka
(74) *Attorney, Agent, or Firm* — Fujitsu Patent Center

(57) ABSTRACT

A storage apparatus of the present disclosure includes a plurality of storing units having different life times, and a processor configured to manage a data block to be stored in the plurality of storing units. The processor is configured to determine or infer an access characteristic for the data block, and store the data block in a storing unit in accordance with the determined or inferred access characteristic, among the plurality of storing units having the different life times. This enables to extend the life times of the storing units.

10 Claims, 20 Drawing Sheets

FIG. 5

120: MAPPING TABLE

| LOGICAL ADDRESS | Flag | NON-VOLATILE DEVICE ADDRESS |
|---|---|---|
| VOLUME#LBA | Flag | SCM#→Page# or SSD-Pool#→block#→Offset |
| VOLUME#1 LBA-100 | 1 | SCM1→Page15 |
| VOLUME#1 LBA-150 | 1 | SCM1→Page20 |
| VOLUME#1 LBA-500 | 1 | SCM1→Page80 |
| VOLUME#1 LBA-600 | 0 | SSD-Pool1→block10→Offset3 |
| VOLUME#2 LBA-200 | 1 | SCM1→Page20 |
| VOLUME#2 LBA-250 | 1 | SCM1→Page80 |
| VOLUME#2 LBA-300 | 1 | SCM1→Page20 |
| VOLUME#2 LBA-400 | 0 | SSD-Pool1→block10→Offset3 |

FIG. 17

120A: MAPPING TABLE

| LOGICAL ADDRESS | Flag | NON-VOLATILE DEVICE ADDRESS | REFERENCE COUNTER |
|---|---|---|---|
| VOLUME#LBA | Flag | SSD-Pool#→block#→Offset | DEDUPLICATION REFERENCE COUNT |
| VOLUME#1 LBA-100 | 1 | SSD-Pool1→block10→Offset1 | 1 |
| VOLUME#1 LBA-150 | 1 | SSD-Pool1→block15→Offset5 | 3 |
| VOLUME#1 LBA-500 | 1 | SSD-Pool1→block10→Offset7 | 2 |
| VOLUME#1 LBA-600 | 0 | SSD-Pool2→block10→Offset3 | 2 |
| VOLUME#2 LBA-200 | 1 | SSD-Pool1→block15→Offset5 | 3 |
| VOLUME#2 LBA-250 | 1 | SSD-Pool1→block10→Offset7 | 2 |
| VOLUME#2 LBA-300 | 1 | SSD-Pool1→block15→Offset5 | 3 |
| VOLUME#2 LBA-400 | 0 | SSD-Pool2→block10→Offset3 | 2 |

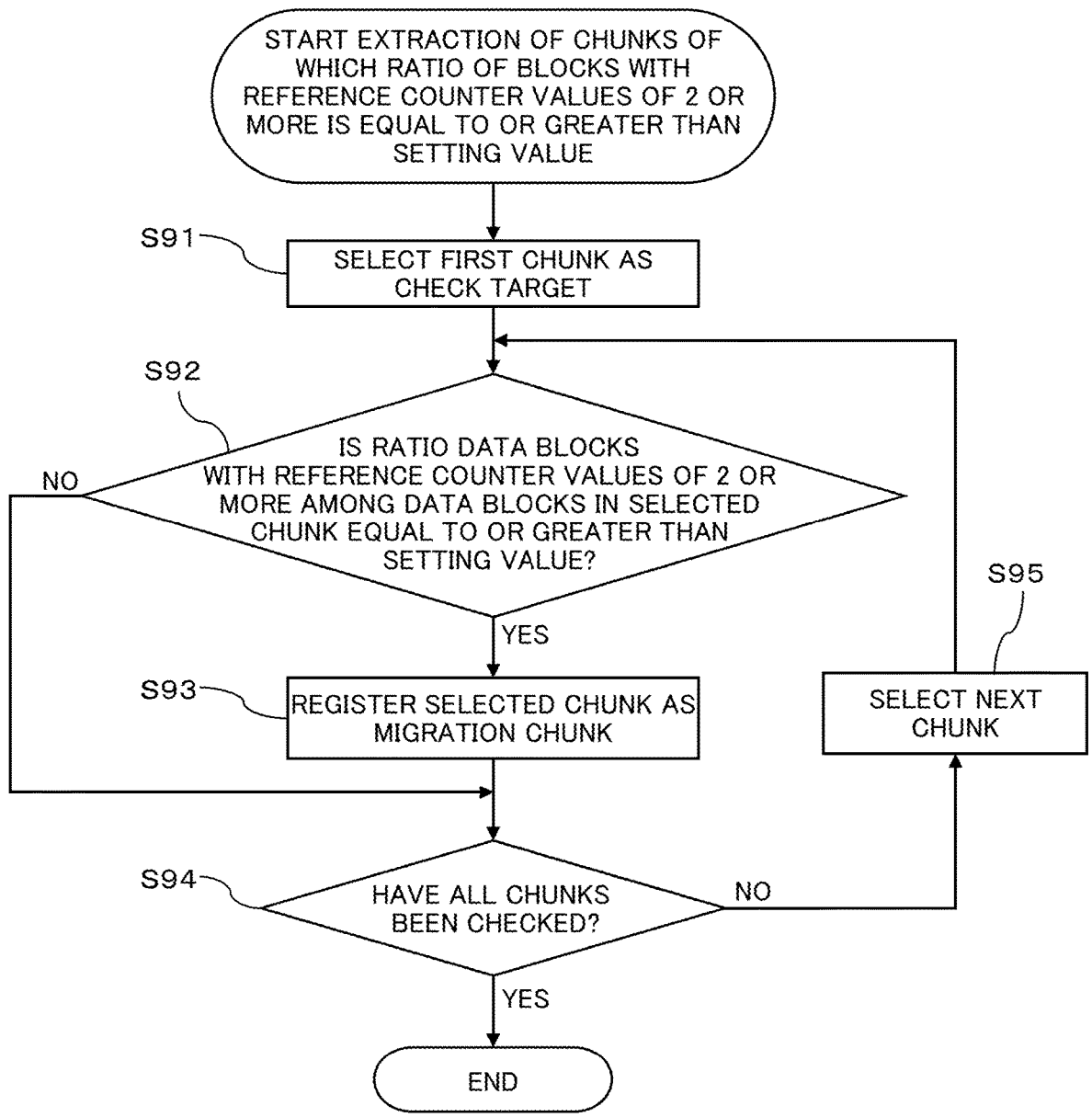

STORAGE APPARATUS AND STORAGE CONTROL APPARATUS

CROSS-REFERENCE TO RELATED APPLICATION

This application is based upon and claims the benefit of priority of the prior Japanese Application No. 2016-174473 filed on Sep. 7, 2016 in Japan, the entire contents of which are hereby incorporated by reference.

FIELD

The present disclosure relates to a storage apparatus and a storage control apparatus.

BACKGROUND

Solid state drives (SSDs) are storage media in which flash memories are utilized. Because flash memories suffer from the characteristic of degradation of elements caused by write-erase operations, SSDs configured from flash memories have an upper limit of the amount of write data. One indicator of the life time of an SSD defined by the upper limit of the amount of write data is a DWPD, for example. DWPD is an abbreviation for drive write per day, and is a value indicating how many times the entire capacity of an SSD can be overwritten every single day.

In order to extend the life time of an SSD having the upper limit of the amount of write data, a data compression technique to reduce the size of data written to the SSD or a data deduplication technique to reduce the data write cycle are used in storage apparatuses utilizing SSDs.

Patent Document 1: Japanese Laid-open Patent Publication No. 2005-108304
Patent Document 2: Japanese Laid-open Patent Publication No. 2015-201050
Patent Document 3: Japanese Laid-open Patent Publication No. 2015-204118

It is expected that technology that can enable higher capacities and less expensive costs, such as TLCs, will become mainstream technology for flash memories, rather than high-reliability and longer-lifetime SLCs and MLCs, although the upper limits of the amount of write data decrease. This is because a higher capacity of a drive can increase the writable capacity per day, even though the DWPD value, an indicator of the life time of the entire drive, is smaller. SLC is an abbreviation for single level cell, MLC is an abbreviation for multiple level cell, and TLC is an abbreviation for triple level cell.

The amounts of data accesses and read/write ratios of storage apparatuses, however, vary depending on workloads of tasks. Accordingly, in order to use SSDs in a reliable manner in a mixed workload environment in which a storage apparatus is used for multiple tasks, a technique to extend the life times of SSDs remains important even when high-capacity SSDs are now available.

Therefore, as a method to extend the life times of SSDs having small DWPDs, a development of a new access method that can reduce the amount of write data and allows once-written-data to be used fundamentally as read intensive is expected. Merely carrying out a compression process and a deduplication process of data, however, cannot ensure the data to become read intensive. For that reason, storing write intensive data to an SSD having a smaller DWPD, i.e., an SSD having a shorter life time, may shorten the life time of the SSD.

SUMMARY

A storage apparatus of the present disclosure includes a plurality of storing units having different life times, and a processor configured to manage a data block to be stored in the plurality of storing units. The processor is configured to determine or infer an access characteristic for the data block, and store the data block in a storing unit in accordance with the determined or inferred access characteristic, among the plurality of storing units having the different life times.

The object and advantages of the invention will be realized and attained by means of the elements and combinations particularly pointed out in the claims.

It is to be understood that both the foregoing general description and the following detailed description are exemplary and explanatory and are not restrictive of the invention, as claimed.

BRIEF DESCRIPTION OF THE DRAWINGS

FIG. 5 is a diagram depicting one example of a mapping table associating logical volumes with non-volatile devices in the first embodiment;

FIG. 17 is a diagram depicting one example of a mapping table associating logical volumes with non-volatile devices in the second embodiment;

FIGS. 19 and 20 are flowcharts illustrating a migration data extraction process by the storage control apparatus of the second embodiment.

DESCRIPTION OF THE PREFERRED EMBODIMENTS

Figure 1:
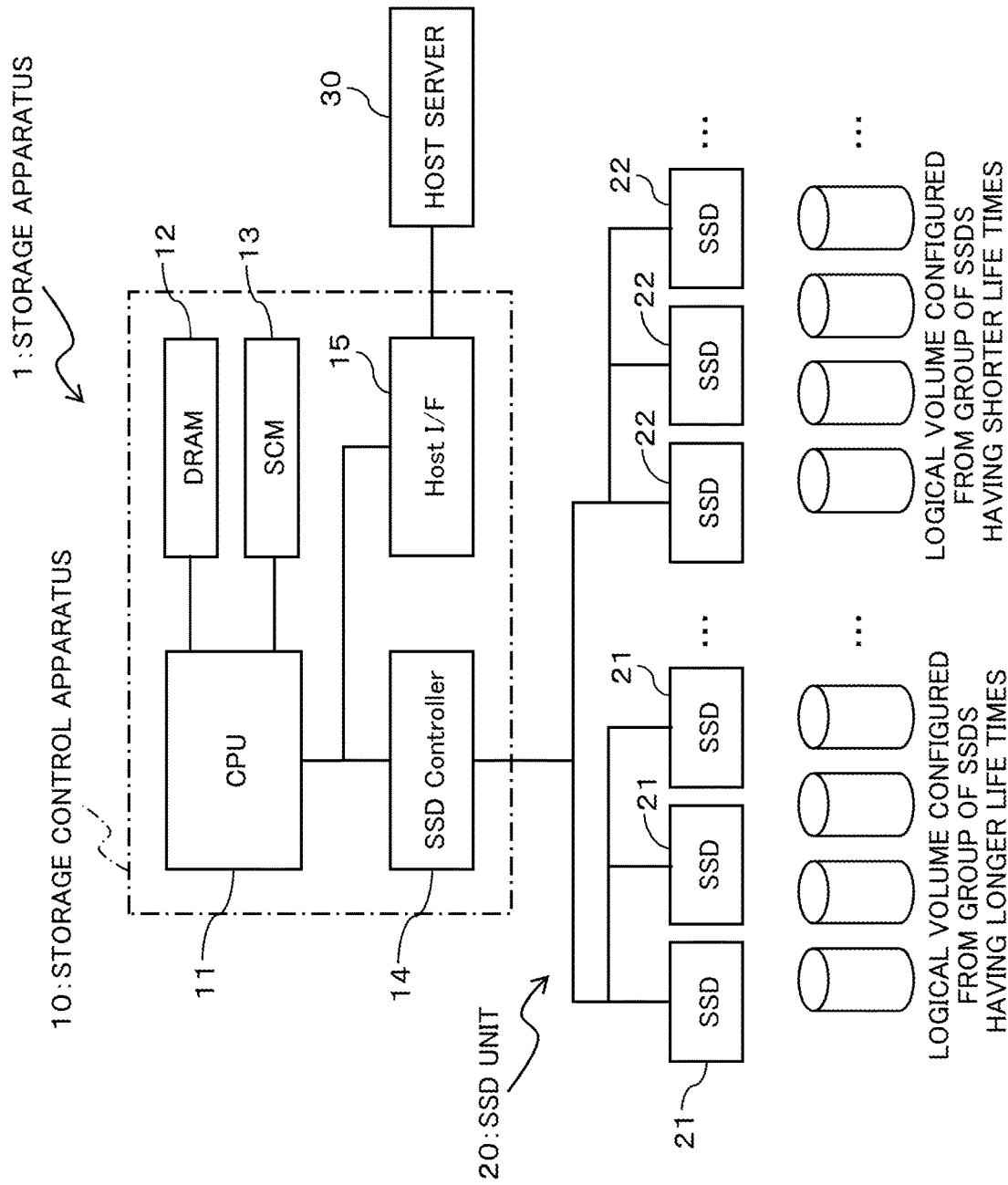
FIG. 1 is a block diagram depicting one example of a hardware configuration of a storage apparatus including a storage control apparatus as a first embodiment of the present invention.

Hereinafter, embodiments of a storage apparatus and a storage control apparatus disclosed in the present application will be described in detail with reference to the drawings. Note that the embodiments described below are merely exemplary, and it is not intended to exclude a wide variety of modifications and applications of techniques that are not described explicitly in the embodiments. In other words, the present embodiments may be practiced in various modifications without departing from the spirit thereof. In addition, it is not intended that only elements depicted in the drawings are provided, and other functions may be included. Further, the embodiments may be combined in suitably manner in the extent as long as the contents of processes have no contradiction.

(1) Summary of Present Embodiments

In the present embodiments (first and second embodiments), when a host server requests a storage apparatus to save target data, the access characteristic of the target data is determined. Here, as the access characteristic, a determination as to whether the target data is read intensive or not is made. When the access characteristic of the target data is determined as not read intensive, the access characteristic of the target data may be inferred as write intensive.

Note that a read-intensive data block is a data block that is probable to become a target of a read access, rather than becoming a target of a write access. On the contrary, a write-intensive data block is a data block that is probable to become a target of a write access, rather than becoming a target of a read access. Hereinafter, read intensive may also be referred to as reading intensive, and write intensive also be referred to as writing intensive.

Then, among SSDs (storing units) having different DWPDs (life time indicators) in the storage apparatus, an optimal SSD in accordance with the determination result of the access characteristic is selected. The target data block is written, and is stored and saved in the selected SSD. For example, the target data block that has been determined as read intensive may be stored in an SSD having a smaller DWPD (a shorter life time). On the contrary, a target data block that has been determined as not read intensive target data block, in other words, the target data block that has been inferred as write intensive, may be stored in an SSD having a larger DWPD (a longer life time). Further, when the access characteristic of the data block that has been inferred as write intensive and stored in the SSD having a larger DWPD (larger-DWPD SSD) is determined as read intensive after the inference, that data block may be migrated from the larger-DWPD SSD to an SSD having a smaller DWPD (smaller-DWPD SSD).

As described above, in accordance with the present embodiments (the first and second embodiments), a data block with the access characteristic that is determined as read intensive is written to an SSD having a smaller DWPD than the other SSDs. Furthermore, a data block with the access characteristic that is determined as not read intensive, in other words, a data block with the access characteristic that is inferred as write intensive, is written to an SSD that has a larger DWPD than the other SSDs. Accordingly, it is possible to write a data block in an optimal SSD in accordance with the access characteristic of the data block among SSDs having different life time indicators, and particularly it is possible to extend the life times of smaller-DWPD SSDs.

For example, the storage apparatus of the present embodiments (the first and second embodiments) may be configured as follows.

The storage apparatus of the present embodiments (the first and second embodiments) includes multiple SSDs (storing units) having different life times (DWPDs), and a manager (storage control apparatus) configured to manages a data block to be stored in the multiple SSDs. The manager includes a determining processor and a storing processor. The determining processor is configured to determine or infer the access characteristic for a data block. The storing processor is configured to store the data block in an SSD in accordance with the access characteristic determined or inferred by the determining processor, among the multiple SSDs having different life times.

In this case, the manager may have a deduplication function to deduplicate a data block, and the determining processor may determine or infer the access characteristic on the basis of a reference count (duplication count) of data block managed by the deduplication function. In addition, the determining processor may determine the access characteristic of a data block having the reference count of two or more as read intensive, and the storing processor may store the data block having the reference count of two or more, in an SSD having a shorter life time (smaller DWPD) than the other SSDs. Further, the determining processor may infer the access characteristic of a data block with the characteristic of not being read intensive as write intensive, and the storing processor may store the data block with the access characteristic of not being read intensive, in an SSD having a longer life time than the other SSDs.

Particularly, the storage apparatus of the first embodiment that will be described below with reference to FIGS. 1-13, may include a temporary storing unit configured to temporarily store a write-target data block to the multiple SSDs having different life times from the host server, as a data block. The temporary storing unit may be a storage class memory (SCM), for example. In this case, the determining processor is configured to determine or infer the access characteristic of the data block stored in the SCM. The storing processor is configured to then store the data block with the access characteristic that is determined as read intensive by the determining processor, from the SCM to an SSD having a shorter life time than the other SSDs. In contrast, the determining processor is configured to infer the access characteristic of a data block that has a reference count of one, and for which a certain time duration elapses after the data block has been written, as write intensive. The storing processor is configured to store the data block with the access characteristic that is inferred as write intensive by the determining processor, from the SCM to an SSD having a longer life time than the other SSDs.

Further, in a storage apparatus of the second embodiment that will be described below with reference to FIGS. 14-20, an SSD having a longer life time than the other SSDs stores a write-target data block to the multiple SSDs having different life times from the host server as a data block. In this case, the determining processor is configured to determine or infer the access characteristic of the data block stored in the SSD having a longer life time than the other SSDs. The storing processor is configured to then store the data block with the access characteristic that is determined as read intensive by the determining processor, from the SSD having a longer life time than the other SSDs, to in an SSD having a shorter life time than the other SSDs.

(2) First Embodiment

(2-1) Hardware Configuration

Referring to FIG. 1, one example of a hardware configuration of a storage apparatus 1 including a storage control apparatus 10 as the first embodiment of the present invention will be described. FIG. 1 is a block diagram depicting one example of the hardware configuration thereof.

As depicted in FIG. 1, the storage apparatus of the first embodiment 1 includes the storage control apparatus 10 and an SSD unit 20. The storage control apparatus 10 manages a data block to be stored in the SSD unit 20 in response to an input/output request from the host server 30. The SSD unit 20 includes multiple SSDs 21 and 22 having different DWPDs (i.e., different life times), which are controlled by the storage control apparatus 10. The SSDs 21 are SSDs having longer life time, i.e., greater DWDPs (longer-lifetime or greater-DWDP SSDs), whereas the SSDs 22 are SSDs having shorter life time, i.e., smaller DWDPs (shorter-lifetime or smaller-DWDP SSDs).

The storage control apparatus 10 of the first embodiment includes a CPU 11, a DRAM 12, an SCM 13, an SSD controller 14, and a host interface 15. As used therein, CPU is an abbreviation for central processing unit, and DRAM is an abbreviation for dynamic random access memory.

The CPU 11 is one example of a processing unit (processor) that performs a wide variety of controls and computations. The CPU 11 is communicatively connected to the DRAM 12, the SCM 13, the SSD controller 14, and the host interface 15. In place of a computation processing unit, e.g., the CPU 11, an electric circuit, such as an integrated circuit (IC), e.g., an micro processing unit (MPU), an application specific integrated circuit (ASIC), and a field programmable gate array (FPGA), may be used as the processor, for example.

In addition, the CPU 11 provides a wide variety of functions by executing an operating system (OS) and programs stored in storing units, such as the DRAM 12 and the SCM 13. Particularly, as will be described later with reference to FIG. 2, the CPU 11 of the first embodiment may provide functions as a data caching processor 111, a data compressing and deduplicating processor 112, an SCM write buffer manager 113, a data access characteristic determining processor 114, a data migration controller 115, an SSD pool manager 116, and an SSD driver 117.

The DRAM 12 is a memory device that temporarily stores a wide variety of data and programs, and includes a cache area and a memory area. The cache area temporarily stores write-target data received from the host server 30 and read-target data to be transmitted to the host server 30. The memory area may temporarily store data and an application program when the CPU 11 executes the program. The application program may be a program executed by the CPU 11 for achieving the storage control function of the present embodiment, for example.

The SCM 13 is provided as a write buffer, and has an access performance between the access performance of the DRAM 12 and the access performances of the SSDs 21 and 22. In other words, the SCM 13 has a higher access performance than those of the SSDs 21 and 22, and the DRAM 12 has a higher access performance than that of the SCM 13. The SCM 13 is one example of a temporary storing unit configured to temporarily stores write-target data block from the host server 30 to the multiple SSDs 21 and 22 having different life times.

The SSD controller 14 controls each of the SSDs 21 and 22 in the SSD unit 20 in accordance with an instruction from the CPU 11. The SSD controller 14 may provide functions as the SSD pool manager 116 and the SSD driver 117, which will be described later with reference to FIG. 2.

The host interface (host I/F) 15 is communicatively connected to the host server 30 using hardware compliant with the FC, the SAS, the Ethernet®, and the like. Using such hardware as a communication path, the storage apparatus 1 of the present embodiment transmits and receives data to and from the host server 30. Note that FC is an abbreviation for Fibre Channel, SAS is an abbreviation for serial attached SCSI, and SCSI is an abbreviation for small computer system interface.

When a data write is requested from the host server 30 to the storage apparatus 1 (the storage control apparatus 10), write-target data from the host server 30 is temporarily stored in the DRAM 12 via the host interface 15. In this case, when a write through process is adopted, a write completion response is returned to the host server 30 only after the data stored in the DRAM 12 is written to the SCM 13 or an SSD 21 or 22 which is non-volatile medium capable of storing data even after a power-off. In contrast, when a write-back process is adopted, a write completion response is returned to the host server 30 at the time when the write-target data is stored in the DRAM 12, and data (data block) is then migrated to a non-volatile medium asynchronously.

When the write-back process is adopted, the storage control apparatus 10 may have a cluster configuration for mirroring data with another storage control apparatus 10, in order to prepare for a data lost in the DRAM 12 caused by a hardware failure and the like. In the present embodiment, the write through process differs from the write-back process in terms of the difference of the timing when a write completion response is transmitted to the host server 30. A mirroring process of data in the DRAM 12 in a cluster is not relevant to the spirit of the technique of the present application. Hence, in the present embodiment, a case in which the storage control apparatus 10 has a single-node configuration not adopting a cluster configuration, and a write-back process is adopted, will be described. Because a read process is a process to identify a physical storage location of read-target data from an address of a logical volume and to transfer the read-target data to the host server 30 in the present embodiment, descriptions therefor are omitted in the present embodiment.

(2-2) Functional Configuration

Figure 2:
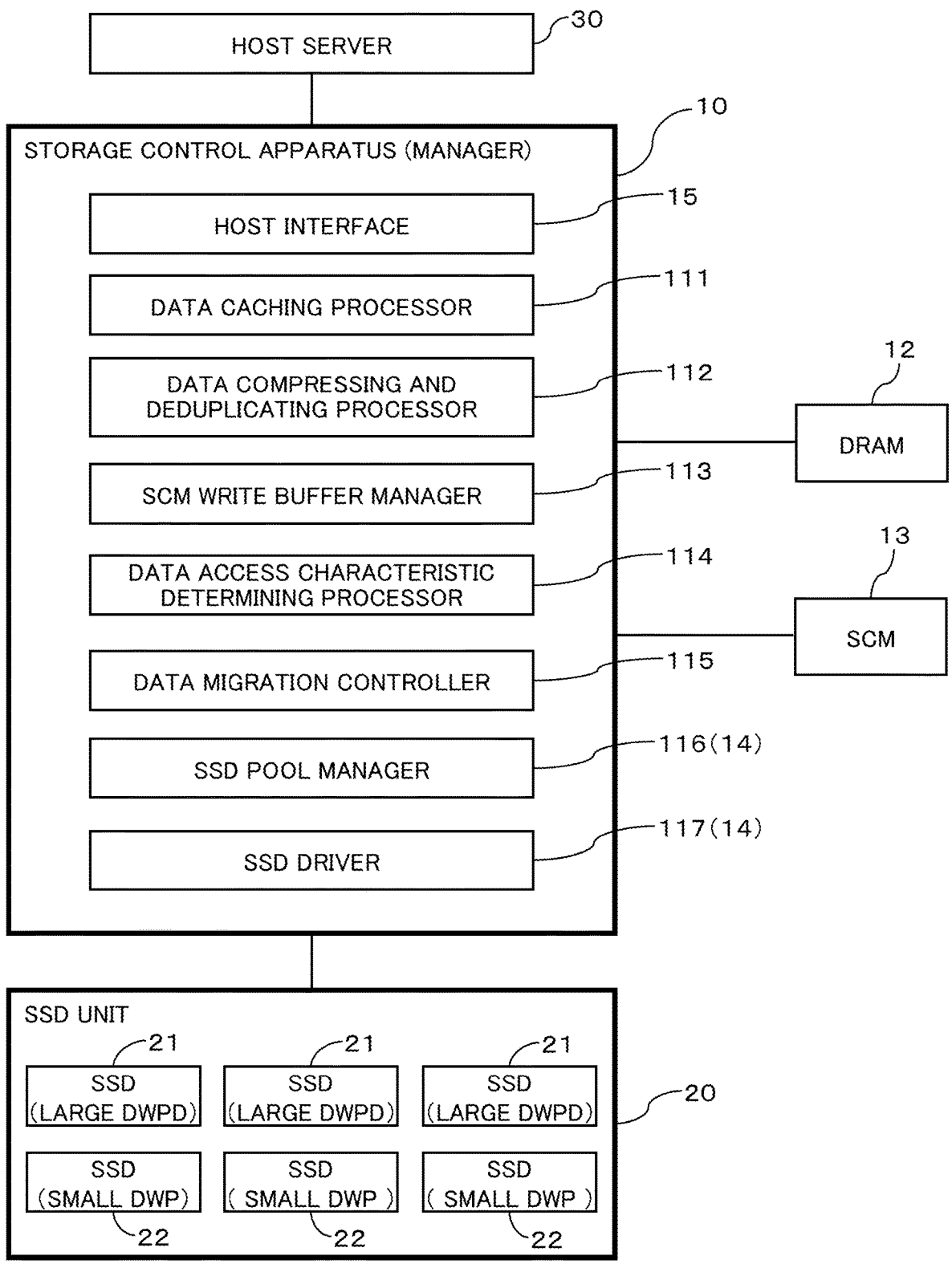
FIG. 2 is a block diagram depicting one example of a functional configuration of the storage control apparatus depicted in FIG. 1.

Next, referring to FIG. 2, a functional configuration of the storage control apparatus (manager) 10 of the first embodiment will be described. Now, FIG. 2 is a block diagram depicting one example of a functional configuration of the storage control apparatus 10 depicted in FIG. 1.

The storage control apparatus 10 of the first embodiment manages data blocks to be stored in the multiple SSDs 21 and 22 in the storage apparatus 1 including the multiple SSDs 21 and 22 having different DWPDs (i.e., having different life times). As depicted in FIG. 2, in the storage control apparatus 10, the CPU 11 may function as the data caching processor 111, the data compressing and deduplicating processor 112, the SCM write buffer manager 113, the data access characteristic determining processor 114, the data migration controller 115, the SSD pool manager 116, and the SSD driver 117, by executing a program. As set forth above, the SSD controller 14 may provide functions as the SSD pool manager 116 and the SSD driver 117.

Note that the program is provided in a form recorded in a computer-readable, portable, and non-transitory recording medium. Examples of such a recording medium include magnetic disks, optical disks, and magneto-optical disks. Examples of optical disks include compact disks (CDs), digital versatile disks (DVDs), and Blu-ray discs. CDs include a CD-ROM (read only memory), a CD-R (recordable)/RW (ReWritable), and the like. DVDs include a DVD-RAM, a DVD-ROM, a DVD-R, a DVD+R, a DVD-RW, a DVD+RW, a high definition (HD) DVD, and the like.

In this case, the CPU 11 reads the program from a recording medium as described above, and stores it in an internal memory device or an external memory device to use it. The CPU 11 may receive the program through a network, and stores it in the internal memory device or the external memory device.

The host interface 15 is communicatively connected to the host server 30, and transmits and receives data to and from the host server 30, as described above.

The data caching processor 111 provides a data cache function for fast data transfers with the host server 30. The data caching processor 111 retains write-target data transferred from the host server 30 in the DRAM 12, and transmits a write completion response to the host server 30 before writing to an SSD 21 or 22 which is an actual storage location. It enables the data caching processor 111 to carry out a buffer process to increase the write process performance. Further, the data caching processor 111 executes a cache process to retain data in the DRAM 12 after a transfer of the data to the host server 30 when a read of the data is requested from the host server 30. This enables a response to be returned immediately in response to a subsequent read request to the same data. Further, the data caching processor 111 also has a cache hit determination process to determine whether or not a data block has been cached in the DRAM 12, and a least recently used (LRU) control function to discard, from the DRAM 12, a data block that has not been accessed for a long time. Note that the timing to return a completion response to the write request is selected from one of the time point when the data block is cached in the DRAM 12 (write-back scheme), and the time point when the data block is stored in a non-volatile medium, such as the SCM 13 or an SSD 21 or 22 (write through scheme).

The data compressing and deduplicating processor 112 reduces the amount of data received from the host server 30 or the like data. The data compressing and deduplicating processor 112 divides write-target data transferred from the host server 30 into data blocks in a unit of block length (generally 4 kilobytes or 8 kilobytes), and executes a deduplication process and a compression process as follows, on the divided data blocks. When the data length of the write-target data is smaller than the unit of block length, a data block in a unit of block length is generated by padding zero data to the write-target data.

In the deduplication process, it is determined whether or not an identical data block is already stored in the storage apparatus 1, and meta-information is updated without storing the data block if the identical data block is present. Here, the meta-information includes logical block address information (LBA) of a logical volume, mapping information that maps an actual storage location in a physical SSD or SCM, and a reference count, which will be described later. In the compression process, the data block is shrunken and compressed in a reversible manner.

The data compressing and deduplicating processor 112 also has a function to restore deduplicated data blocks, and a function to expand a compressed data block, in response to a read request from the host server 30. The data compressing and deduplicating processor 112 then manages meta-information that records relationships between a logical volume referenced to by a logical unit number (LUN) from the host server 30, a physical SSD 21 or 22 or the SCM 13, and the reference count, which will be described later, in cooperation with the SSD pool manager 116, upon a deduplication process.

Logics of data compression and expansion and logics of deduplication are well-known, and descriptions therefor are omitted in the present embodiment. In addition, in the present embodiment, the order of executions of the deduplication process and the compression process, and whether the compression process is activated or not, are irrelevant. Still, in the present embodiment, because the reference count of a data block managed in the deduplication process is used for determining or inferring the access characteristic of the data block, the deduplication function in the data compressing and deduplicating processor 112 is activated. The reference count may also be referred to as a reference counter, a deduplication reference count, or a duplication count.

The SCM write buffer manager 113 employs the SCM 13 that has an access performance inferior to that of the DRAM 12, but is less expensive and has a greater capacity than those of the DRAM 12, and is non-volatile, and is expensive than the SSDs 21 and 22 but is faster than the SSDs 21 and 22. In other words, the SCM write buffer manager 113 is the SCM 13 having an access performance between that of the DRAM 12 and those of the SSDs 21 and 22, and buffers write-target data (data block) from the host server 30 before the data block is stored in an SSD 21 or 22. This can improve the storage performance.

Further, in the first embodiment, the amount of data blocks to be migrated between SSD pools (groups of SSDs) can be reduced by determining the access characteristic of data block on the SCM 13 before the data block is actually stored in an SSD 21 or 22. The SSD unit 20 includes an SSD pool to which larger-DWPD SSDs 21 belong, and another SSD pool to which smaller-DWPD SSDs 22 belong (refer to FIG. 4).

Referring to FIGS. 14-20, a storage apparatus 10A without an SCM 13 will be described in a second embodiment. In other words, a technique for an optimum data allocation utilizing the SCM 13 will be described in the first embodiment, whereas a technique for an optimum data allocation without utilizing the SCM 13 will be described in the second embodiment. For that purpose, in the second embodiment, the SCM write buffer manager 113 in the first embodiment is not provided (refer to FIG. 15).

The data access characteristic determining processor 114 corresponds to a determining processor configured to determine or infer the access characteristic for a data block in order to make a migration determination of the data block at regular intervals. The data access characteristic determining processor 114 may be sometimes simply referred to as the determining processor 114. Particularly, the data access characteristic determining processor 114 determines whether the access characteristic of data to be written from the host server 30 (divided data blocks) is read intensive or not. The present embodiment aims to extend the life times of the shorter-lifetime SSDs 22 by placing read-intensive data blocks in the smaller-DWPD (shorter-lifetime) SSDs 22. To achieve this, a read-intensive data block is found by the data access characteristic determining processor 114. Data blocks that are not read intensive at some point in time are all handled as write intensive. As time elapses after that point, the data block that was inferred as write intensive at the previous determination timing may be determined as read intensive at later determination timing.

Note that the determining processor 114 may determine or infer the access characteristic on the basis of the reference count (duplication count) of a data block managed by the above-described deduplication process (deduplication function) in first embodiment. The determining processor 114 determines the access characteristic of data block having a reference count of two or more as read intensive, for example. Alternatively, the determining processor 114 may infer the access characteristic of a data block that is not read intensive (its reference count is not equal to or greater than two), as write intensive. In this case, the determining processor 114 may infer the access characteristic of a data block that has a reference count of one, and for which a certain time duration elapses after the data block has been written, as write intensive.

The data migration controller 115 executes a migration of a data block, and is one example of a storing controller configured to store the data block an SSD 21 or 22 in accordance with the access characteristic determined or inferred by the determining processor 114, among the multiple SSDs having different life times. Particularly, the data migration controller 115 carries out a process to migrate, from the SCM 13 to a smaller-DWPD SSD 22, the data block determined as read intensive in the access characteristic determination by the determining processor 114. The operation of a data migration process varies depending on whether the SCM write buffer manager 113 is provided or not, and the difference will be described later.

Note that the data migration controller 115 stores the data block to an SSD 21 or 22 in accordance with the access characteristic determined or inferred by the determining processor 114, among the multiple SSDs 21 and 22 having different life times, in first embodiment. In this case, the data migration controller 115 may store a data block having a reference count of two or more, in an SSD 22 having a shorter life time (smaller DWPD) than the other SSDs 21. In addition, the data migration controller 115 may store a data block with an access characteristic of not being read intensive, in an SSD 21 having a longer life time than the other SSDs 22. Further, the data migration controller 115 stores a data block with the access characteristic that has been determined as read intensive by the determining processor 114, from the SCM 13 to an SSD 22 having a shorter life time than the other SSDs 21. In contrast, the data migration controller 115 stores a data block with the access characteristic that has been inferred as write intensive by the determining processor 114, from the SCM 13 to an SSD 21 having a longer life time than the other SSDs 22.

The SSD pool manager 116 manages relationships between logical volumes referenced to with LUNs from the host server 30 and the physical SSDs 21 and 22 and the SCM 13, in cooperation with the data compressing and deduplicating processor 112. The particular management technique is the one well-known in the thin provisioning function that reserves blocks called "chunks" from the physical SSDs 21 and 22, and associates those chunks with logical volumes, and such a technique is also used in the present embodiment. Further, the SSD pool manager 116 may have a function to bundle SSDs having the same or similar DWPDs that are life time indicators, into an SSD pool. In the present embodiment, an SSD pool to which larger-DWPD SSDs 21 belong, and another SSD pool to which smaller-DWPD SSDs 22 belong, are defined in the SSD unit 20 (refer to FIG. 4).

The SSD driver 117 transmits and receives data (data blocks) to and from the SSDs 21 and 22.

(2-3) Operations

Next, referring to the flowchart (Steps S1-S5) depicted in FIG. 3, a data write process in the storage apparatus 1 including the storage control apparatus 10 depicted in FIG. 2 will be described.

Initially, when write-target data is received together with a write request from the host server 30 by the host interface 15, the write-target data is buffered in the DRAM 12 by the data caching processor 111 (Step S1). At the timing of the buffering, a write completion response is returned from the data caching processor 111 via the host interface 15 to the host server 30.

After the write completion response is returned to the host server 30, the data in the DRAM 12 is divided into data blocks in a unit of a certain block length. A data amount reduction process, such as a compression process and a deduplication process, is then executed on each data block by the data compressing and deduplicating processor 112 (Step S2). In the present embodiment, a determination of the access characteristic of a data block is made on the basis of the reference count of the data block. Accordingly, whether the compression process is activated or not, and the order of executions of the compression process and the deduplication process are not relevant to the present embodiment. Therefore, in the present embodiment, descriptions will be made focusing on the deduplication process.

In the deduplication process, when it is determined that the write-target data block in the DRAM 12 duplicates, two types of meta-information are updated to indicate that the data is identical to the duplicating data that has been stored in a non-volatile device (the SCM 13 or an SSD 21 or 22). The two types of meta-information are mapping information and a reference counter value described above. A write-back process to write back the data block to the non-volatile device is not carried out, however, and the data in the DRAM 12 is discarded after the update of the meta-information. When a data block is determined as not duplicating, a write-back process is carried out. Then, after the data block in the DRAM 12 is copied to the SCM 13, the data block in the DRAM 12 is deleted after the two types of meta-information for that data block are updated.

Figure 4:
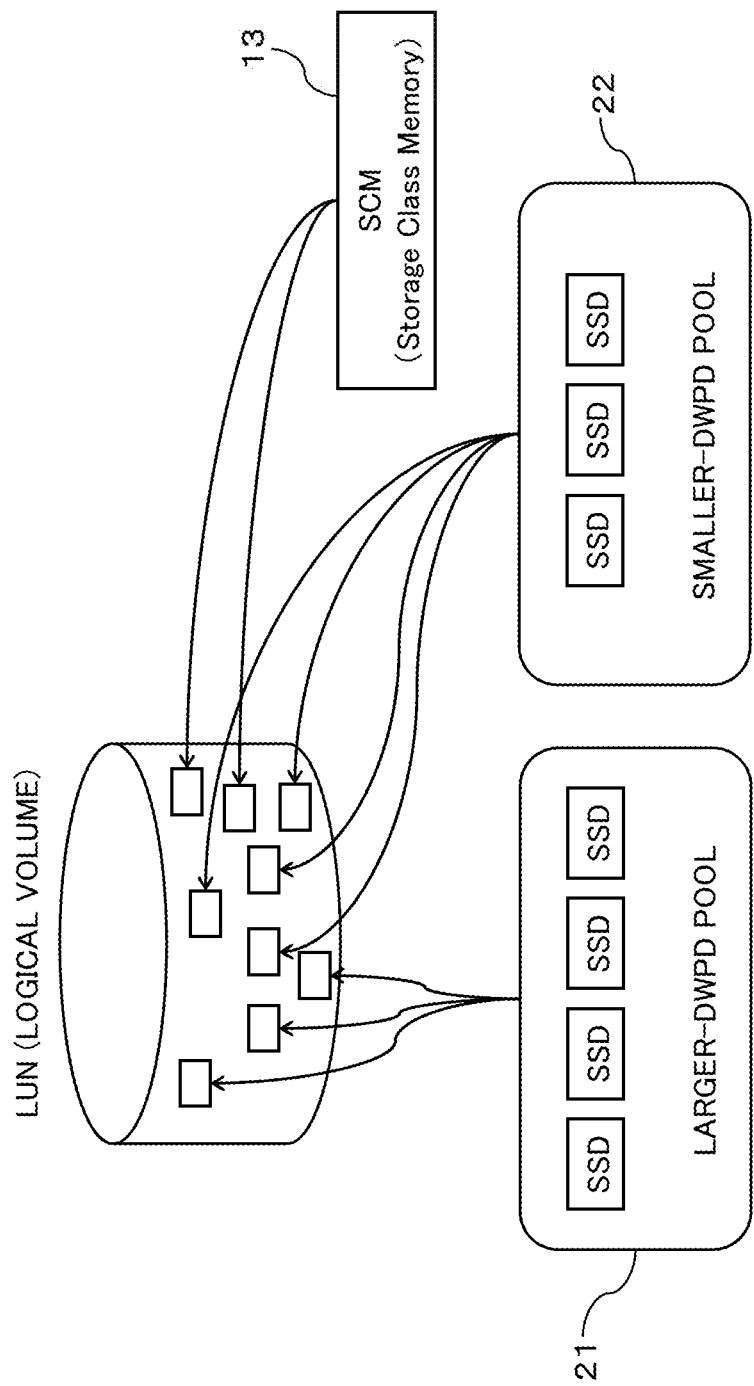
FIG. 4 is a diagram illustrating a data arrangement in a logical volume in the first embodiment.

Here, FIG. 4 is a diagram illustrating a data arrangement in a logical volume in the first embodiment, depicting relationships between the logical volume and non-volatile devices in which actual data in the logical volume is placed. In the first embodiment, the actual data in the logical volume is stored in one of the SCM 13 and the SSDs 21 and 22. Immediately after a write-target data block in the DRAM 12 is written back, the write-target data is retained temporarily in the SCM 13 by the SCM write buffer manager 113 (Step S3). Thereafter, for the write-target data, the access characteristic of the data block in the SCM 13 is determined by the determining processor 114 (Step S4). The write-target data block is then migrated to an SSD 21 or 22 in the SSD pools by the data migration controller 115, in accordance with the determination result of the access characteristic (Step S5).

The two types of meta-information, i.e., the mapping information and the reference counter value, are managed in the DRAM 12 using a mapping table 120 of logical volumes (refer to FIG. 5) and an SCM allocation list 122 (refer to FIG. 8), for example. The mapping information is information that maps between a "combination of a logical volume number and a logic block address" and a "combination of a non-volatile device number and a block location". The reference counter value corresponds to a "reference number of logical data blocks" when one physical data block is associated with multiple pieces of logical data blocks. Note that the reference counter value is also retained in the SSD pool manager 116 that carries out a "logical-physical address conversion process" called the "thin provisioning". Because the thin provisioning process is a well-known process, detailed descriptions of the thin provisioning process are omitted here.

Here, FIG. 5 is a diagram depicting one example of the mapping table 120 associating logical volumes with non-volatile devices in the first embodiment. The following information for the corresponding data blocks is retained in entries in the mapping table 120 in the tabular format as depicted in FIG. 5, which is expanded on the DRAM 12 for example.

Logical address (Volume# LBA): It is information of a combination between a logical volume number corresponding to an LUN accessed from the host server 30, and an LBA indicating the location of a data block in that logical volume.

Flag: It is information indicating whether a non-volatile device storing the data block indicated by the logical address is the SCM 13 or an SSD 21 or 22. In the first embodiment, the flag is set to one when the data block is stored in the SCM 13, whereas the flag is set to zero when the data block is stored in an SSD 21 or 22.

Non-volatile device address (SCM#-Page# or SSD-Pool#-block#-Offset): It is information of the location of the data block in the SCM 13 when the state of the flag is one, whereas information of the logical location of the data block in the SSD pool when the state of the flag is zero.

Figure 6:
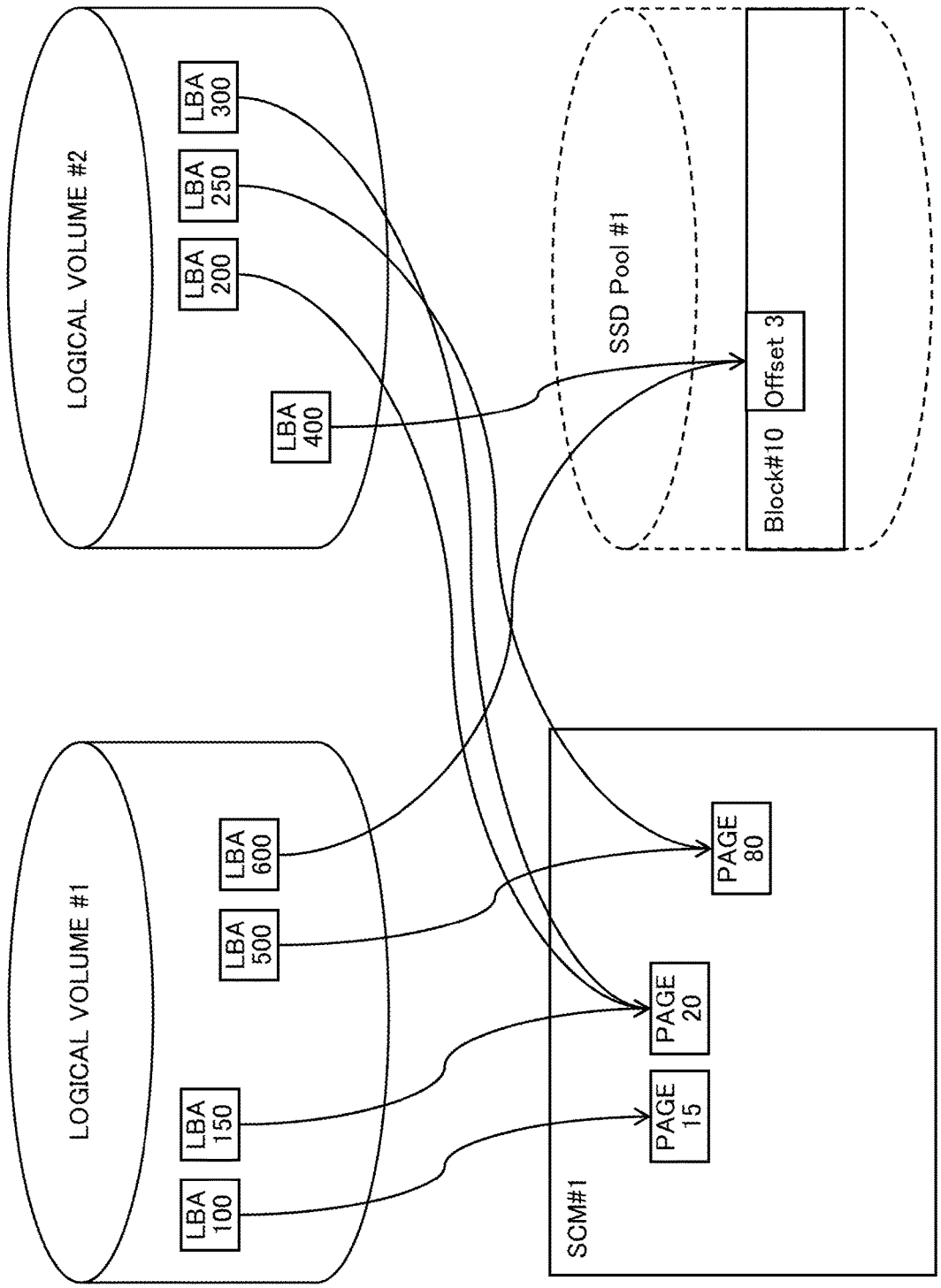
FIG. 6 is a diagram depicting a specific example of mapping with the mapping table depicted in FIG. 5.

Now, FIG. 6 is a diagram depicting a specific example of mapping with the mapping table 120 depicted in FIG. 5, which conceptualizes mapping with the mapping table 120 depicted in FIG. 5.

Figure 3:
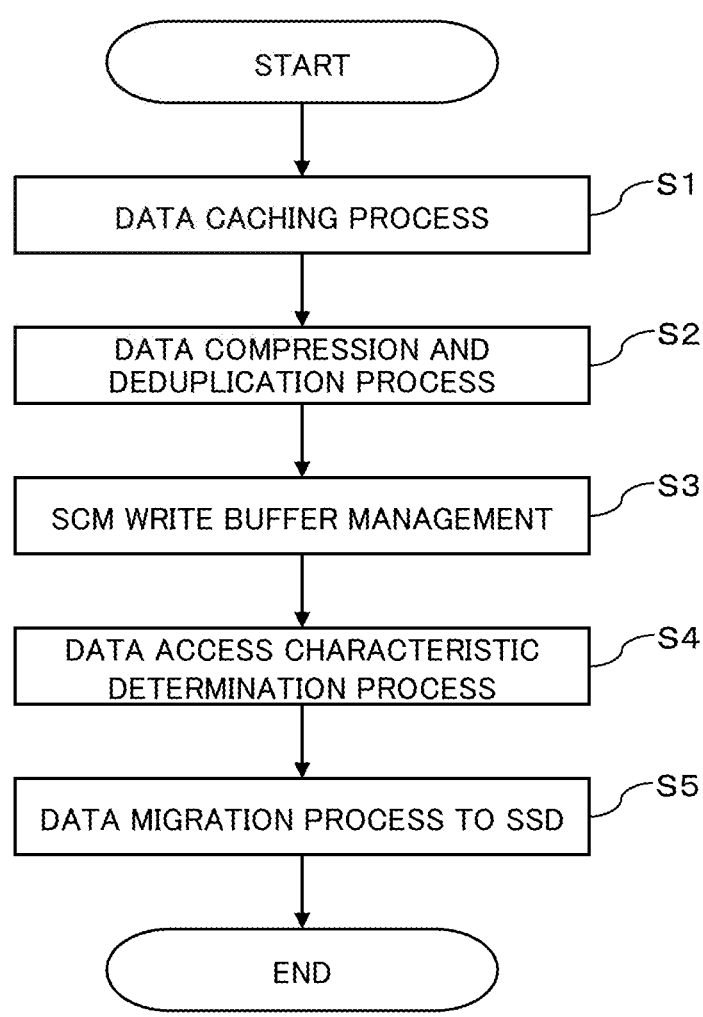
FIG. 3 is a flowchart illustrating a data write process in the storage apparatus including the storage control apparatus depicted in FIG. 2.
Figure 7:
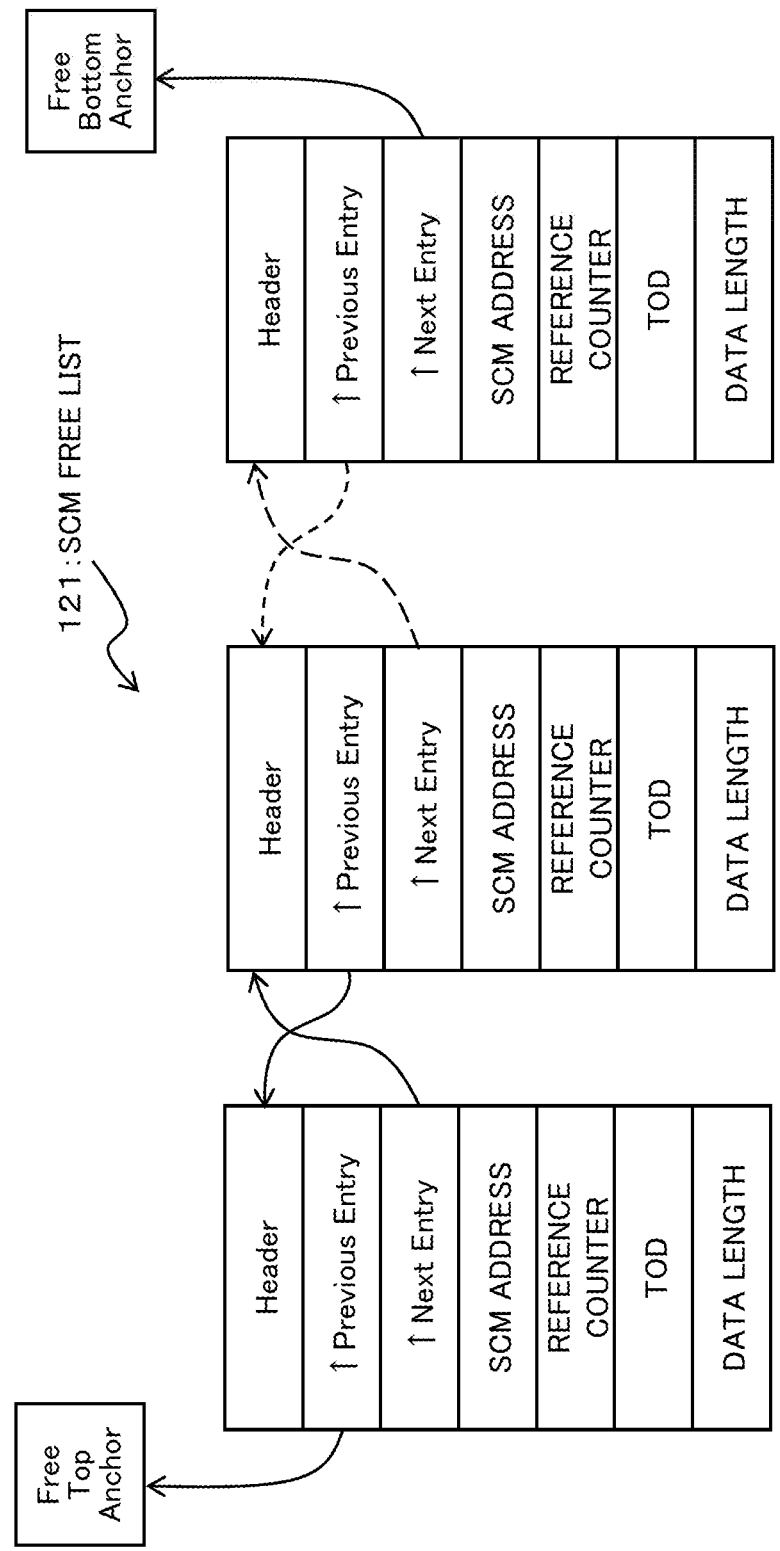
FIG. 7 is a diagram depicting one example of a structure of an SCM free list in the first embodiment.
Figure 8:
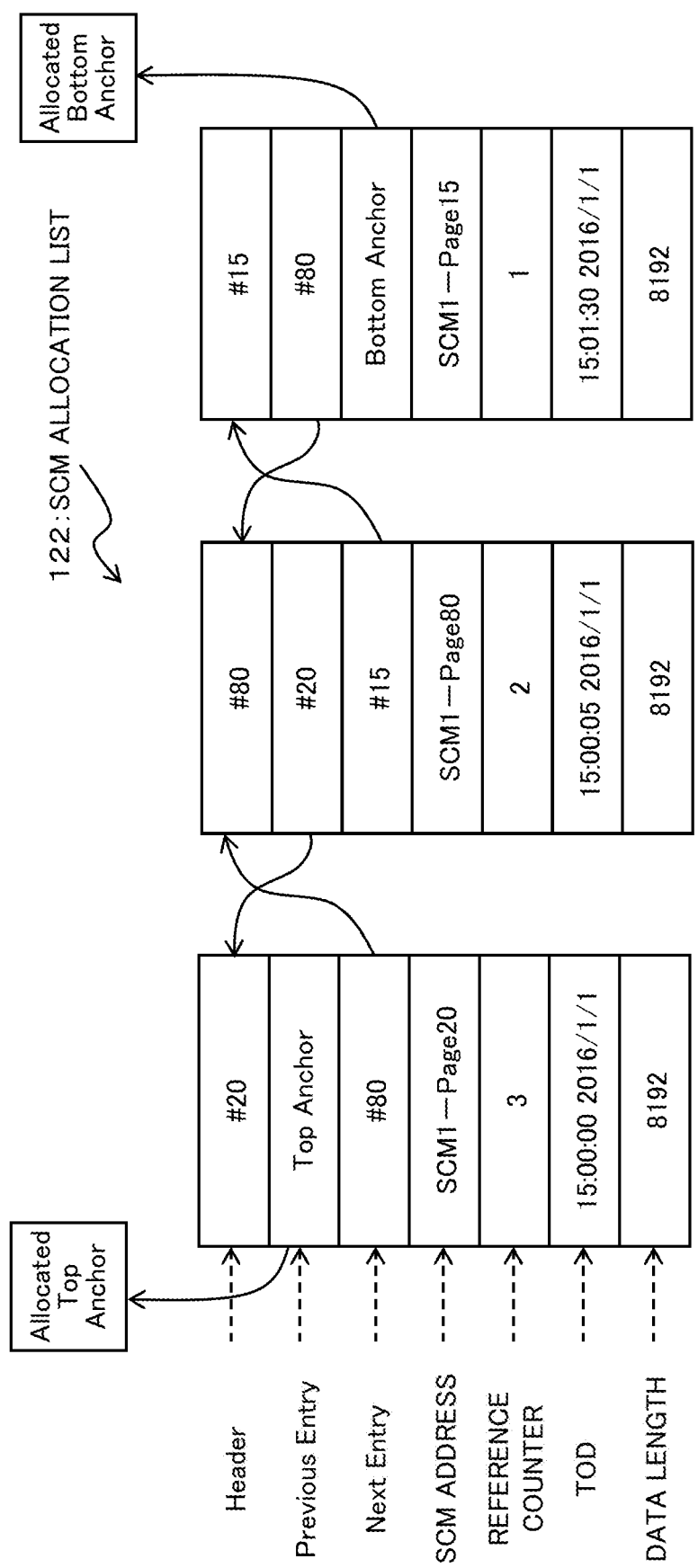
FIG. 8 is a diagram depicting one example of a structure of an SCM allocation list in the first embodiment.

In the SCM write buffer management in Step S3 in FIG. 3, an SCM free list 121 (refer to FIG. 7) and an SCM allocation list 122 (refer to FIG. 8) of write buffer areas reserved in the SCM 13, are managed. The write buffer areas are areas that temporarily store write-target data from the host server 30 until it is migrated to the final stored location, i.e., an SSD 21 and 22. Each of the lists 121 and 122 is managed in a queue as a linked list. When a write-target data block from the DRAM 12 is written back, a vacant area (free area) referenced to in the SCM free list 121 is dequeued from the selected SCM free list 121 as a write-back destination area, and is then enqueued to the SCM allocation list 122. Now, FIG. 7 is a diagram depicting one example of a structure of the SCM free list 121 in the first embodiment. FIG. 8 is a diagram depicting one example of a structure of the SCM allocation list 122 in the first embodiment.

The SCM free list 121 and the SCM allocation list 122 have fundamentally the same structures, wherein the SCM free list 121 is a linked list of vacant areas in the SCM 13, whereas the SCM allocation list 122 is a linked list of areas storing data of a logical volume in the SCM 13. The following information is retained in entries in the SCM free list 121 and the SCM allocation list 122 in the tabular formats as depicted in FIGS. 7 and 8, respectively, which are expanded on the DRAM 12, for example.

Header: It is an identifier of the entry and a lock flag for a mutual exclusion process upon a queue operation are included. In the example depicted in FIG. 8, a sequential number utilizing a page number in the SCM 13 is used as an identifier of the entry.

Previous entry pointer (Previous Entry): It points the immediately previous entry in the linked list. It points an anchor (Free Top Anchor or Allocated Top Anchor) when the entry is the top entry. For example, the first Previous Entry points the Free Top Anchor in FIG. 7, whereas the Top Anchor as the top Previous Entry points the Allocated Top Anchor in FIG. 8.

Next entry pointer (Next Entry): It points the immediately next entry in the linked list. It points an anchor (Free Bottom Anchor or Allocated Bottom Anchor) when the entry is the bottom entry. For example, the bottom Next Entry points the Free Bottom Anchor in FIG. 7, whereas the Bottom Anchor as the bottom Next Entry points the Allocated Bottom Anchor in FIG. 8.

SCM address: It is a combination of an SCM number when multiple SCMs 13 are provided and a sequential number of an area divided in a unit of page in each SCM 13, identifying a physical area. Note that an SCM address in the SCM free list 121 is information of the above-described combination identifying a location of a vacant area.

Reference counter: It is a value indicating a reference count (duplication count) of a data block when the data block corresponding to the entry is referenced to from multiple logical addresses. This value is managed by the deduplication function of the data compressing and deduplicating processor 112. When the data block is a data block for which deduplication has not been executed, in other words, it is not a duplicating data block, the reference counter assumes a value of one. In the example depicted in FIG. 8, the reference count of the entry of the sequential number #20 is three, the reference count of the entry of the sequential number #80 is two, and the reference count of the entry of the sequential number #15 is one.

TOD (time of day): It is the time when the entry is enqueued to the SCM allocation list 122.

Data length: It is a size (in a certain block length) of a data block corresponding to the entry stored in the SCM 13. When no compression process is carried out on the data, the data block has a size in a fixed length, which is the same size of the page size for dividing the SCM 13. In the example depicted in FIG. 8, 8192 is set to the data length for each entry.

When it is determined that the data block in the DRAM 12 to be written from the host server 30 duplicates with another data block that has been written in the deduplication process in Step S2 in FIG. 3, and when that data block is present in the SCM 13, the following process is carried out. In other words, when a value of "1" is set to the flag in the mapping table 120 corresponding to that data block, the reference counter value in the SCM allocation list 122 is incremented by one. The data block in the DRAM 12 is then deleted, without executing a write-back process on the data block in the DRAM 12.

At the time when the data migration controller 115 completes a migration of the data block in the SCM 13 to an SSD 21 or 22 by executing a data migration process to the SSD 21 or 22, the SCM write buffer manager 113 dequeues the entry from the SCM allocation list 122 corresponding to that data block, and enqueues the entry to the SCM free list 121.

Next, the data access characteristic determination process in Step S4 in FIG. 3 includes an interval time adjustment process and a migration data extraction process. The interval time adjustment process is a process to adjust the time interval at which the data access characteristic determining processor 114 operates. The migration data extraction process is a process to extract data blocks to be migrated from the SCM 13 to a larger-DWPD SSD 21, and data blocks to be migrated from the SCM 13 to a smaller-DWPD SSD 22, which is executed by the data access characteristic determining processor 114.

Figure 9:
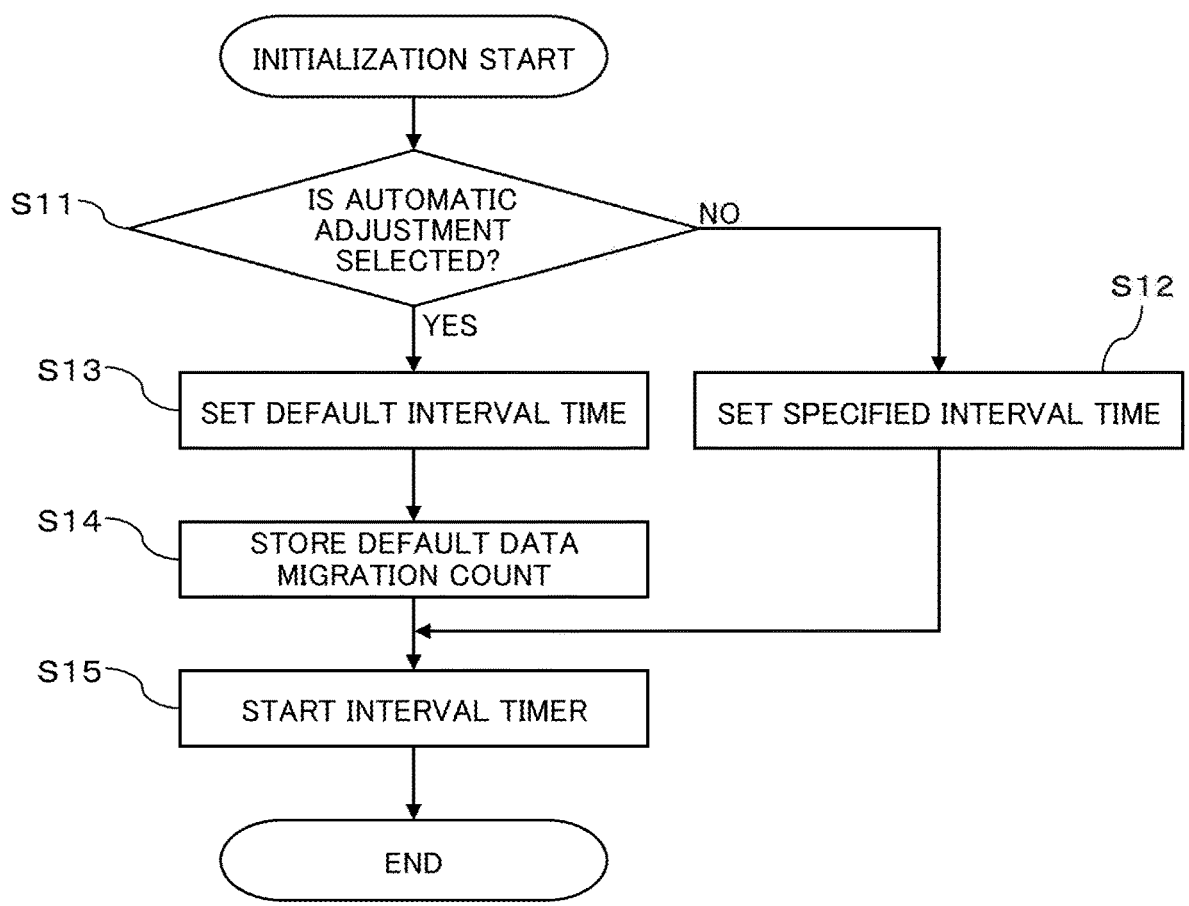
FIG. 9 is a flowchart illustrating an initialization process by the storage control apparatus of the first embodiment.
Figure 10:
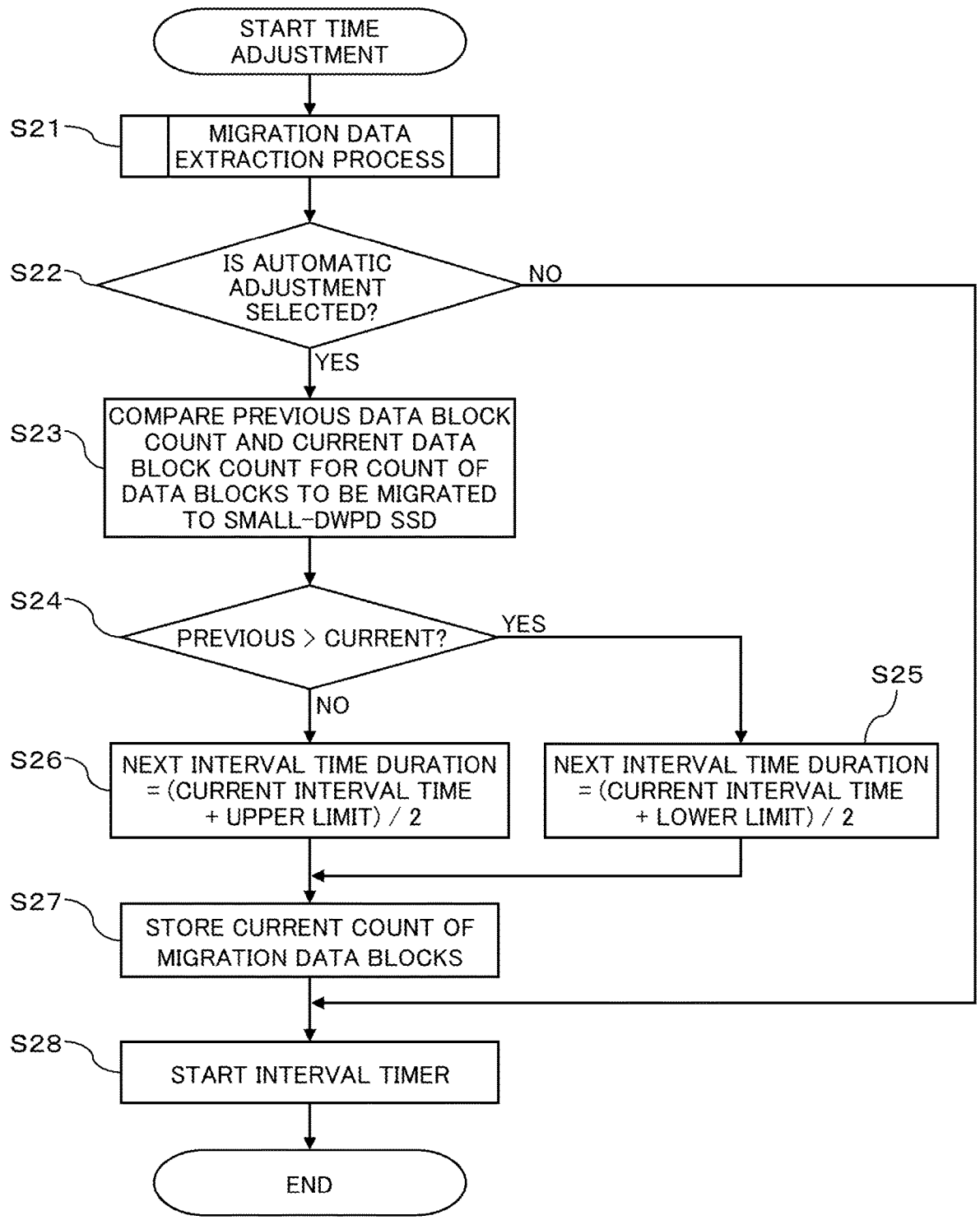
FIG. 10 is a flowchart illustrating a time adjustment process by the storage control apparatus of the first embodiment.
Figure 11:
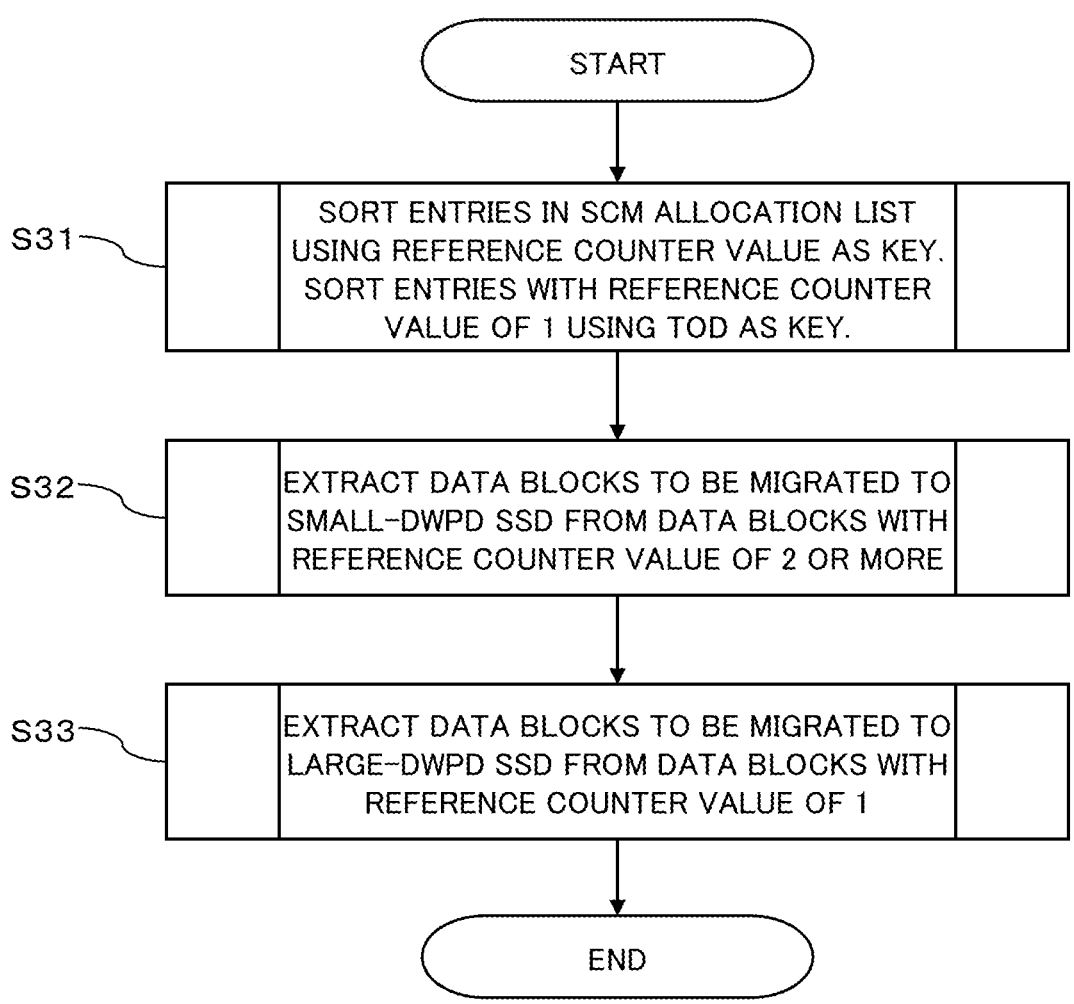
FIGS. 11-13 are flowcharts illustrating a migration data extraction process by the storage control apparatus of the first embodiment.
Figure 12:
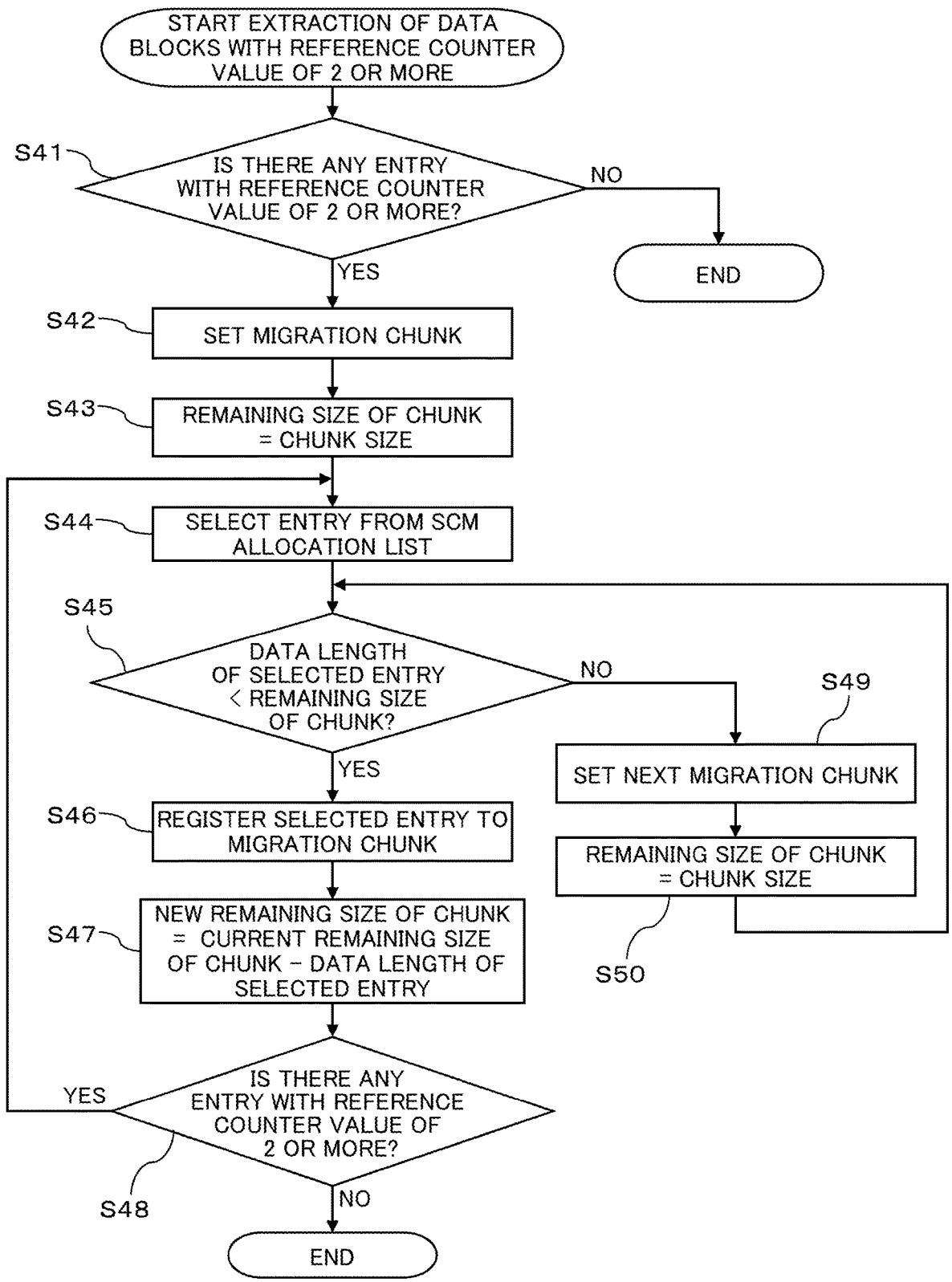
Figure 13:
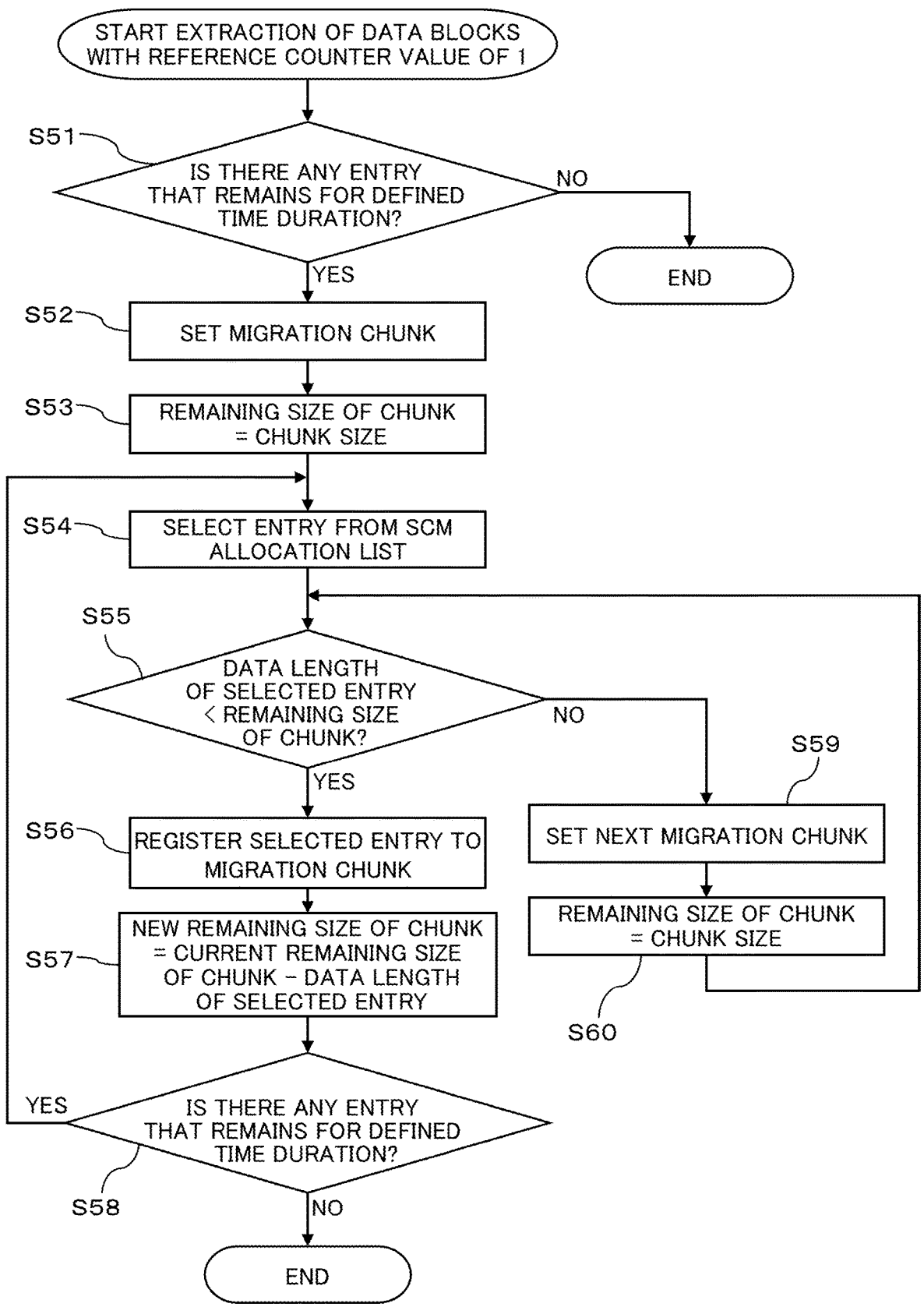

The interval time adjustment process includes an initialization process depicted in FIG. 9, for example, and a time adjustment process depicted in FIG. 10, for example. Here, the initialization process is a process that is executed when the apparatus starts its operations and when the setting of the operation mode is changed, and the time adjustment process is a process that is executed at every interval time. In addition, in the migration data extraction process, processes depicted in FIGS. 11-13 are executed, for example.

Here, referring to the flowchart (Steps S11-S15) depicted in FIG. 9, the initialization process by the storage control apparatus 10 of the first embodiment will be described.

When fixed time is specified to the interval time, i.e., an automatic adjustment has not been selected, in the initialization process (the NO route from Step S11), the specified fixed time is set (Step S12). An interval timer is then started with the specified fixed time (Step S15), and a process depicted in FIG. 10 is executed.

In contrast, when an automatic adjustment of the interval time has been selected (the YES route from Step S11), a default value of the interval time is set (Step S13). In addition, a default value of a data migration block count used in an automatic adjustment to be carried out upon a next startup is set and stored (Step S14). The interval timer is then started with the default value of the interval time (Step S15), and a process depicted in FIG. 10 is executed.

Next, referring to the flowchart (Steps S21-S28) depicted in FIG. 10, the time adjustment process by the storage control apparatus 10 of the first embodiment will be described.

In the time adjustment process, initially, a migration data extraction process that will be described later with reference to FIGS. 11-13 is executed (Step S21). Then, when fixed time is specified to the interval time, i.e., an automatic adjustment has not been selected (the NO route from Step S22), an interval timer is started with the specified fixed time (Step S28) and a process depicted in FIG. 10 is executed once again. As a result, the migration data extraction process (Step S21) is executed with the fixed time interval.

In contrast, when an automatic adjustment of the interval time has been selected (the YES route from Step S22), the previous count and current count which are number of data blocks to be migrated to a small-DWPD SSD 22 that have been extracted in the migration data extraction process (Step S21) are compared (Step S23). In other words, the count of the data block to be migrated to a small-DWPD SSD 22 extracted in the current migration data extraction process and the count of the data block that has been migrated to a small-DWPD SSD 22 extracted in the previous migration data extraction process are compared. Note that an SSD 22 having a smaller-DWPD may sometimes be referred to as a small-DWPD SSD 22, whereas an SSD 21 having a larger-DWPD may sometimes be referred to as a large-DWPD SSD 21.

When the previous data block count is greater than the current data block count as the result of the comparison (the YES route from Step S24), the next interval time is reduced (Step S25). For example, the value obtained by dividing the sum of the current interval time and the lower limit of the interval time by a certain index value of 2 is calculated as the next interval time. This can reduce the interval time while preventing it from being lower than its lower limit.

In contrast, when the previous data block count is equal to or less than the current data block count (the NO route from Step S24), the next interval time is elongated (Step S26). For example, the value obtained by dividing the sum of the current interval time and the upper limit of the interval time by a certain index value of 2 is calculated as the next interval time. This can elongate the interval time while preventing it from exceeding its upper limit.

After the calculation of the next interval time, the number of data blocks migrated to a small-DWPD SSD 22 extracted in the current migration data extraction process (Step S21) is stored as the previous data block count for the next comparison (Step S27). Thereafter, the interval timer is restarted with the next interval time calculated in Step S25 or S26 (Step S28), and a process depicted in FIG. 10 is executed once again. As a result, the migration data extraction process (Step S21) is executed at an interval of the interval time.

As set forth above, in first embodiment, the interval time is automatically adjusted in the processes in Steps S23-S26 in FIG. 10. This permits effective utilization of areas in the SCM 13, while preventing write-target data (data block) temporarily saved in the SCM 13, from overflown from the SCM 13.

Next, referring to the flowcharts depicted in FIGS. 11-13, the migration data extraction process by the storage control apparatus 10 of the first embodiment will be described.

Initially, referring to the flowchart (Steps S31-S33) depicted in FIG. 11, an overall flow of the migration data extraction process by the storage control apparatus 10 of the first embodiment will be described. The SSD pools (groups of SSDs; refer to FIG. 4) to which data blocks are migrated, include multiple SSDs 21 and 22 which are bundled in accordance with their DWPD values. In this case, an access to an SSD pool is made in a unit of block called "chunk". As will be described later, the migration data extraction process of the first embodiment is a process to bundle data blocks that are stored in the SCM 13 and are to be migrated in a unit of chunk.

The migration data extraction process of the first embodiment includes three processes (Steps S31-S33) depicted in FIG. 11. In the first process (Step S31), the entries in the SCM allocation list 122 are sorted in ascending order using the reference counter value as a key. Entries having reference counter values of one are sorted in the order of TOD from the oldest to the newest.

After the sort process in Step S31, an extraction process to migrate data blocks having reference counter values of two or more to the smaller-DWPD SSD pool (SSDs 22) is carried out (Step S32). Here, a data block having a reference counter value of two or more means that the data block is a duplicating data block that is referenced to from multiple pieces of logical data. The mechanism of the deduplication ensures that only the reference counter value is decremented and the physical data block is not modified even when the duplicating logical data is updated. In other words, it is ensured that the physical data block of a data block having a reference counter value of two or more remains read-only data until the reference counter value becomes 1. A chunk that is a bundle of pieces of data having the reference counter values of two or more is a read intensive block, and data to be stored in the smaller-DWPD SSD pool. The process executed in Step S32 in FIG. 11 will be described later with reference to FIG. 12.

After the extraction of data blocks to be migrated to the smaller-DWPD SSD pool (SSDs 22) is completed, a process to check entries having reference counter values of one is executed (Step S33), as a process to extract pieces of data to be migrated to the larger-DWPD SSD pool (SSDs 21). The process executed in Step S33 in FIG. 11 will be described later with reference to FIG. 13.

Referring to the flowchart (Steps S41-S50) depicted in FIG. 12, the extraction process of data blocks having reference counter values of two or more, executed in Step S32 in FIG. 11 will be described.

Here, the entries in the SCM allocation list 122 have been sorted in ascending order using the reference counter value as a key, by the previous process (the process in Step S31). Accordingly, in the process depicted in FIG. 12, data blocks corresponding to entries are registered in sequence until a migration chunk (block) becomes full while the remaining size of the chunk is being calculated on the basis of the data length for each entry. When the migration chunk becomes full, data blocks are registered in sequence in the subsequent migration chunk. Pieces of data to be migrated to the smaller-DWPD SSD pool are extracted by repeating this process until there is no more data block having a reference counter value of two or more.

Specifically, as depicted in FIG. 12, initially, the sorted SCM allocation list 122 is referenced to in order to determine whether or not there is any entry having a reference counter value of two or more (Step S41). When there is no entry having a reference counter value of two or more (the NO route from Step S41), the extraction process of data blocks having reference counter values of two or more ends.

In contrast, when there is any entry having a reference counter value of two or more (the YES route from Step S41), an empty migration chunk to register data blocks having reference counter values of two or more is set (Step S42). In addition, the chunk size of that migration chunk is set as the remaining size of the chunk (Step S43).

Thereafter, from the SCM allocation list 122, one data block having a reference counter value of two or more is selected (Step S44), and it is determined whether or not the data length of the selected entry is smaller than the remaining size of the chunk (Step S45). When the data length of the selected entry is smaller than the remaining size of the chunk (the YES route from Step S45), the data block corresponding to the selected entry is registered to the migration chunk (Step S46). Thereafter, the value obtained by subtracting the data length of the selected entry from the current remaining size of the chunk is set as the new remaining size of the chunk (Step S47).

It is then determined whether or not there is any entry having a reference counter value of two or more (Step S48). When there is no entry having a reference counter value of two or more (the NO route from Step S48), the extraction process of data blocks having reference counter values of two or more ends. When there is any entry having a reference counter value of two or more (the YES route from Step S48), the characteristic determining processor 114 returns to the process in Step S44.

Alternatively, when the data length of the selected entry is equal to or greater than the remaining size of the chunk (the NO route from Step S45), a new empty migration chunk is set (Step S49). Then, after the chunk size of that migration chunk is set as the new remaining size of the chunk (Step S50), the characteristic determining processor 114 returns to the process in Step S45.

Referring to the flowchart (Steps S51-S60) depicted in FIG. 13, the extraction process of data blocks having reference counter values of one executed in Step S33 in FIG. 11 will be described.

Here, a data block having a reference counter value of one means that, when a logical data block is updated, the pointed physical data block is also updated. Alternatively, there is another case in which an updated data block is stored in a different area, and the pointed old physical data block is invalidated simultaneously with that physical data block being pointed from the updated logical data block. In addition, a reference counter value may be changed from 1 to a greater value due to duplicating data blocks as the time elapses. Accordingly, there is a possibility in that a data block having a reference counter value of one will become a read-only data blocks in the future. Therefore, it is preferred to monitor a reference counter value for a long time duration to some extent. Because the capacity of the SCM 13 is limited, however, data blocks having reference counter values of one, which remain for a defined time duration or longer, are migrated to the larger-DWPD SSD pool in the first embodiment.

The data blocks (entries) having reference counter values of one have been sorted from the oldest to the newest by the previous process (Step S31) using the TOD as a key, when the data block was registered to the SCM 13. The sort result is referenced to, and data blocks (entries) that remain for the defined time duration or longer after registration to the SCM 13 are extracted. Also in the process depicted in FIG. 13, data blocks corresponding to entries are registered in sequence until a migration chunk (block) becomes full while the remaining size of the chunk is being calculated on the basis of the data length for each entry. When the migration chunk becomes full, data blocks are registered in sequence in the subsequent migration chunk. Pieces of data to be migrated to the larger-DWPD SSD pool are extracted by repeating this process until there is no more data block that remains for the defined time duration or longer.

Specifically, as depicted in FIG. 13, initially, the sorted SCM allocation list 122 is referenced to, and it is determined whether or not there is any entry that remains for the defined time duration or longer after its registration among entries having reference counter values of one (Step S51). When there is no such an entry (the NO route from Step S51), the extraction process of data blocks having reference counter values of one ends.

In contrast, when there is any such an entry (the YES route from Step S51), an empty migration chunk to register a data block corresponding to that entry is set (Step S52). In addition, the chunk size of that migration chunk is set as the remaining size of the chunk (Step S53).

Thereafter, from the SCM allocation list 122, one data block that has a reference counter value of one and remains for the defined time duration or longer after its registration is selected (Step S54), and it is determined whether or not the data length of the selected entry is smaller than the remaining size of the chunk (Step S55). When the data length of the selected entry is smaller than the remaining size of the chunk (the YES route from Step S55), the data block corresponding to the selected entry is registered to the migration chunk (Step S56). Thereafter, the value obtained by subtracting the data length of the selected entry from the current remaining size of the chunk is set as the new remaining size of the chunk (Step S57).

It is then determined whether or not there is any entry that remains for the defined time duration or longer after its registration among entries having reference counter values of one (Step S58). When there is no such an entry (the NO route from Step S58), the extraction process of data blocks having reference counter values of one ends. When there is such an entry (the YES route from Step S58), the characteristic determining processor 114 returns to the process in Step S54.

Alternatively, when the data length of the selected entry is equal to or greater than the remaining size of the chunk (the NO route from Step S55), a new empty migration chunk is set (Step S59). Then, after the chunk size of that migration chunk is set as the new remaining size of the chunk (Step S60), the characteristic determining processor 114 returns to the process in Step S55.

Finally, in a data migration process to the SSDs 21 and 22 in Step S5 in FIG. 3, a process to migrate the data blocks (migration chunks) to be migrated to the SSDs 21 and 22 extracted by the data access characteristic determination process in Step S4 in FIG. 3, to the SSDs 21 and 22, is executed. Since the data migration from the SCM 13 to the SSD pools in a unit of chunk is a well-known management technique called the "thin provisioning", the data migration process is not described here.

Once the migration of data blocks in the SCM 13 to the SSDs 21 and 22 completes, the following two processes are requested to the SCM write buffer manager 113 because metadata is updated in the data migration process to the SSDs 21 and 22 in Step S5 in FIG. 3. The first process is a process to dequeue the entries that have been used to manage the migrated data blocks from the SCM allocation list 122, and enqueue the entries to the SCM free list 121. The second process is a process to update the contents of the non-volatile device addresses in the mapping table 120 pointing the migrated data blocks, from the location information in the SCM 13 to the location information in the SSDs 21 and 22, and to change the flag values to a value of zero indicating an SSD.

As described above, in accordance with the first embodiment, destination to store data blocks are assigned between the SSDs 21 and 22, based on the reference counter values managed in the deduplication process. This enables optimal data storages to the SSDs 21 and 22 having different life time indicators (DWPDs) in accordance with the access characteristic of data blocks (whether they are read intensive or write intensive), and particularly enables to extend life times of the smaller-DWPD SSDs 22.

(3) Second Embodiment (3-1) Hardware Configuration

Figure 14:
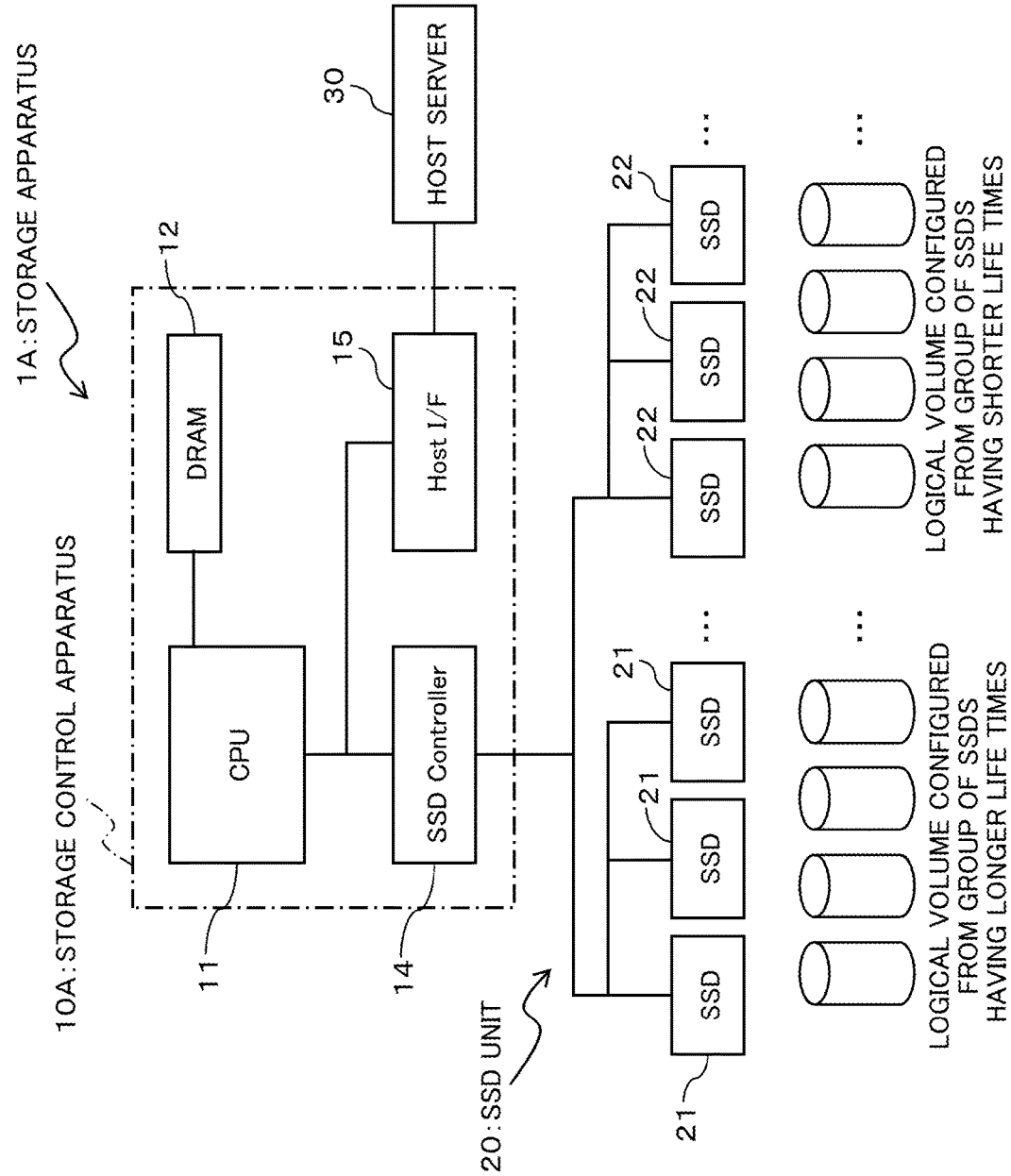
FIG. 14 is a block diagram depicting one example of a hardware configuration of a storage apparatus including a storage control apparatus as a second embodiment of the present invention.

As set forth above, in the first embodiment, a technique for an optimum data allocation utilizing the SCM 13 has been described. In contrast, in the second embodiment, a technique for an optimum data allocation without utilizing the SCM 13 will be described. Hence, as depicted in FIG. 14, a hardware configuration of a storage control apparatus 10A in a storage apparatus 1A of the second embodiment is different from the storage control apparatus 10 of the first embodiment in that an SCM is not provided. FIG. 14 is a block diagram depicting one example of the hardware configuration of the storage apparatus 1A including the storage control apparatus 10A as the second embodiment of the present invention. In FIG. 14, because the reference symbols which are identical to the above-described reference symbols denote the same or substantially the same elements, descriptions therefor are omitted.

As set forth above, in the storage control apparatus 10A in the second embodiment, a hardware configuration having only SSDs as non-volatile devices is adopted. It is considered that an SCM used in the first embodiment provides faster accesses than SSDs, but is more expensive than SSDs. Accordingly, in accordance with the second embodiment, because no SCM is used, the advantages and effects equivalent to those of the first embodiment can be achieved in the configuration that is less expensive than that of the first embodiment.

Similarly to the first embodiment, also in the storage control apparatus 10A in the second embodiment, a case in which a single-node configuration not adopting a cluster configuration and a write-back process are adopted will be described.

(3-2) Functional Configuration

Figure 15:
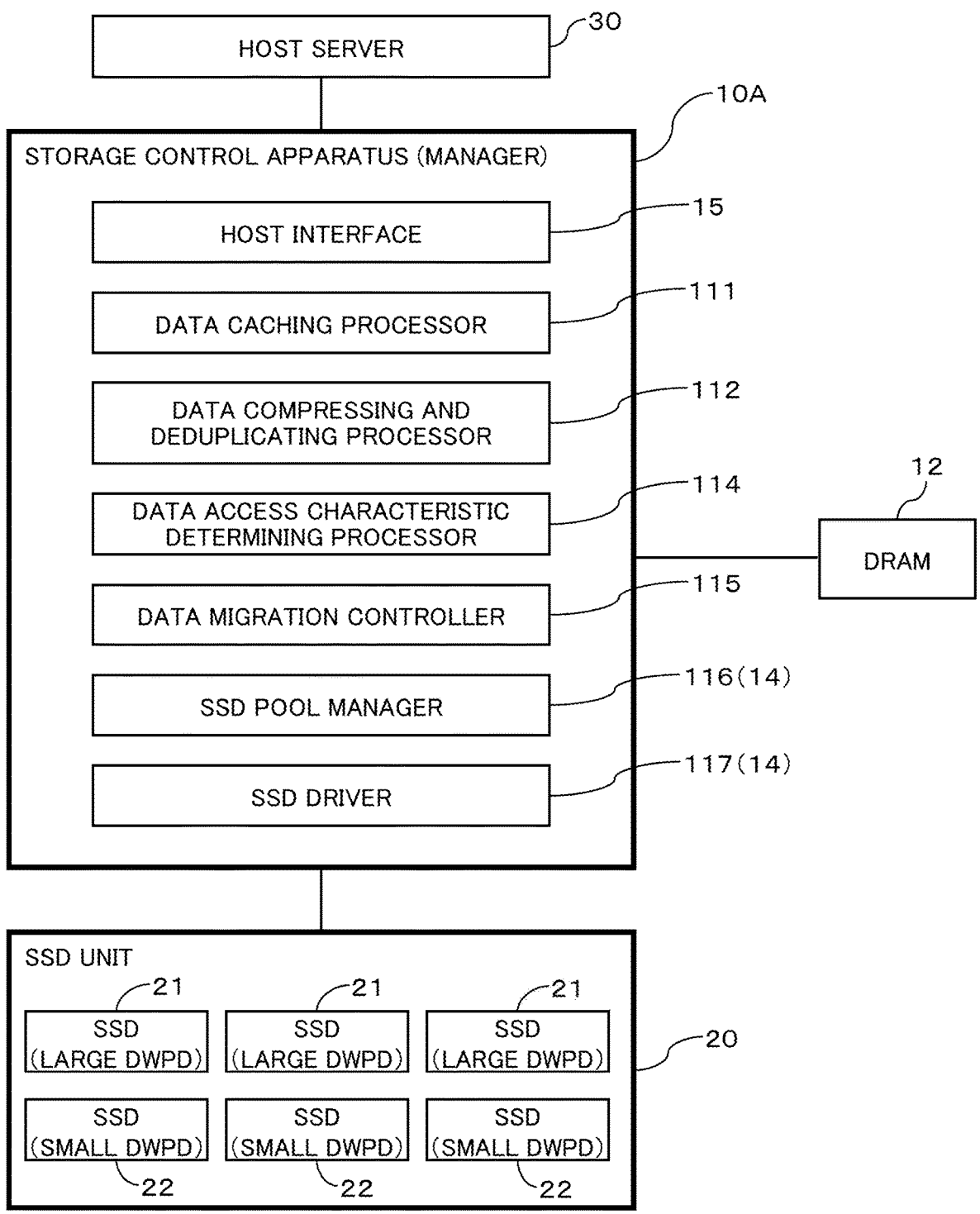
FIG. 15 is a block diagram depicting one example of a functional configuration of the storage control apparatus depicted in FIG. 14.

Next, referring to FIG. 15, a functional configuration of the storage control apparatus (manager) 10A of the second embodiment will be described. Now, FIG. 15 is a block diagram depicting one example of the functional configuration of the storage control apparatus 10A depicted in FIG. 14. In FIG. 15, because the reference symbols which are identical to the above-described reference symbols denote the same or substantially the same elements, descriptions therefor may be omitted.

Similarly to the first embodiment, the storage control apparatus 10A in the second embodiment also manages data blocks stored in multiple SSDs 21 and 22 in the storage apparatus 1A including the multiple SSDs 21 and 22 having different DWPDs. As depicted in FIG. 15, in the storage control apparatus 10A, the CPU 11 may function as the data caching processor 111, the data compressing and deduplicating processor 112, the data access characteristic determining processor 114, the data migration controller 115, the SSD pool manager 116, and the SSD driver 117, by executing a program. As set forth above, the SSD controller 14 may provide functions as the SSD pool manager 116 and the SSD driver 117. Also in the second embodiment, the program is provided in the manner similar to the first embodiment.

Particularly, in the second embodiment, a write-back destination of a data block in the DRAM 12 is the larger-DWPD SSD pool (the longer-lifetime SSDs 21). Stated differently, data blocks having unknown access characteristics are stored in the larger-DWPD SSD pool. The data access characteristic determining processor 114 of the second embodiment then carries out a migration data extraction process on data blocks in the SSDs 21 at regular intervals. Data blocks extracted in the migration data extraction process are migrated in a unit of chunk from the larger-DWPD SSD pool to the smaller-DWPD SSD pool, by the data migration controller 115 of the second embodiment.

Note that the migration process of data blocks from the larger-DWPD SSDs 21 to the smaller-DWPD SSDs 22 carried out in the second embodiment is applicable to an apparatus including an SCM, as in the first embodiment. This realizes an optimal data arrangement in the first embodiment when data blocks that have been stored in the larger-DWPD SSDs 21 and have been inferred as write intensive are determined as read intensive after the inference.

The data caching processor 111 and the data compressing and deduplicating processor 112 of the second embodiment have functions similar to those of the data caching processor 111 and the data compressing and deduplicating processor 112 of the first embodiment, respectively.

Similarly to the first embodiment, the data access characteristic determining processor 114 of the second embodiment is also one example of a determining processor configured to determine or infer the access characteristic for a data block in order to make a migration determination of the data block at regular intervals. Particularly, the characteristic determining processor 114 of the second embodiment determines or infers the access characteristic for a data block stored in a larger-DWPD SSD 21.

Then, the data migration controller (storing processor) 115 of the second embodiment migrates data blocks with the access characteristics that have been determined as read intensive by the characteristic determining processor 114, from the larger-DWPD SSDs 21 to the smaller-DWPD SSDs 22.

Similarly to the first embodiment, in the second embodiment, the access characteristic may be determined or inferred on the basis of the reference count (duplication count) of a data block managed by the deduplication process (deduplication function). The characteristic determining processor 114 determines the access characteristic of data block having a reference count of two or more as read intensive, for example. Alternatively, the characteristic determining processor 114 may infer the access characteristic of a data block that is not read intensive as write intensive.

Further, the SSD pool manager 116 and the SSD driver 117 of the second embodiment have functions similar to those of the SSD pool manager 116 and the SSD driver 117 of the first embodiment, respectively.

(3-3) Operations

Next, referring to the flowchart (Steps S71-S74) depicted in FIG. 16, a data write process in the storage apparatus 1A including the storage control apparatus 10A depicted in FIG. 15 will be described.

Similarly to the first embodiment, initially, when write-target data is received together with a write request from the host server 30 by the host interface 15, the write-target data is buffered in the DRAM 12 by the data caching processor 111 (Step S71). At the timing of the buffering, a write completion response is returned from the data caching processor 111 via the host interface 15 to the host server 30.

After the write completion response is returned to the host server 30, the data in the DRAM 12 is divided into data blocks in a unit of a certain block length. A data volume reduction process, such as a compression process and a deduplication process, is then executed on each data block by the data compressing and deduplicating processor 112 (Step S72). Because a determination of the access characteristic of a data block is made on the basis of the reference count of the data block, descriptions will be made also in the second embodiment, focusing on the deduplication process.

In the deduplication process, when it is determined that the write-target data block in the DRAM 12 duplicates, two types of meta-information are updated to indicate that the data is identical to the duplicating data that has been stored in a non-volatile device (an SSD 21 or 22). The two types of meta-information are mapping information and a reference counter value described above. A write-back process to write back the data block to the non-volatile device is not carried out, however, and the data in the DRAM 12 is discarded after the update of the meta-information. When a data block is determined as not duplicating, a write-back process is carried out. Then, after the data block in the DRAM 12 is copied to a larger-DWPD SSD 21, the data block in the DRAM 12 is deleted after the two types of meta-information for that data block are updated.

In the second embodiment, the actual data in the logical volume is stored in one of the multiple SSDs pools having different DWPDs (in this case, the two types of SSDs 21 and 22). Immediately after a write-target data block in the DRAM 12 is written back, the write-target data is retained in the larger-DWPD SSD pool. Thereafter, for that write-target data, the access characteristic of the data block in the larger-DWPD SSD pool is determined by the characteristic determining processor 114 (Step S73). The chunk (data block) having the access characteristic that has been determined as read intensive by the data migration controller 115 is then migrated from the larger-DWPD SSD pool to the smaller-DWPD SSD pool (Step S74). In contrast, the data block with an access characteristic of not being read intensive is retained in the larger-DWPD SSD pool.

Further, in the second embodiment, the two types of meta-information, i.e., the mapping information and the reference counter value, are managed in the DRAM 12 using a mapping table 120A (refer to FIG. 17) of logical volumes, for example. The mapping information is information that maps between a "combination of a logical volume number and a logic block address" and a "combination of a non-volatile device number and a block location". The reference counter value corresponds to a "reference number of logical data blocks" when one physical data block is associated with multiple pieces of logical data blocks. While reference counter values are also retained in the SSD pool manager 116, as set forth above in the first embodiment, no description is made herein.

Here, FIG. 17 is a diagram depicting one example of the mapping table 120A associating logical volumes with non-volatile devices in the second embodiment. The following information for the corresponding data blocks is retained in entries in the mapping table 120A in the tabular format as depicted in FIG. 17, which is expanded on the DRAM 12 for example.

Logical address (Volume# LBA): It is information of a combination between a logical volume number corresponding to an LUN accessed from the host server 30, and an LBA indicating the location of a data block in that logical volume.

Flag: It is information indicating whether an SSD pool storing the data block indicated by the logical address is the larger-DWPD SSD pool (the longer-lifetime SSDs 21) or another SSD pool. In the second embodiment, the flag is set to one when the data block is stored in the larger-DWPD SSD pool. In contrast, the flag is set to zero when the data block is stored in another SSD pool (the smaller-DWPD SSD pool/the SSDs 22 in the second embodiment).

Non-volatile device address (SSD-Pool#-block#-Offset): It is information of the logical location of the data block in the SSD pool.

Reference counter (deduplication reference count): It is a value indicating a reference count (duplication count) of a data block when the data block corresponding to the entry is referenced to from multiple logical addresses. This value is managed by the deduplication function of the data compressing and deduplicating processor 112. When the data block is a data block for which deduplication has not been executed, in other words, it is not a duplicating data block, the reference counter assumes a value of one. In the example depicted in FIG. 17, the reference count of the data block with a non-volatile device address of SSD-Pool1- block15-Offset5 is three. In addition, the reference count of the data block with a non-volatile device address of SSD-Pool1-block10-Offset7 is two, and the reference count of the data block with a non-volatile device address of SSD-Pool2-block10-Offset3 is two. Further, the reference count of the data block with a non-volatile device address of SSD-Pool1-block10-Offset1 is one.

Figure 18:
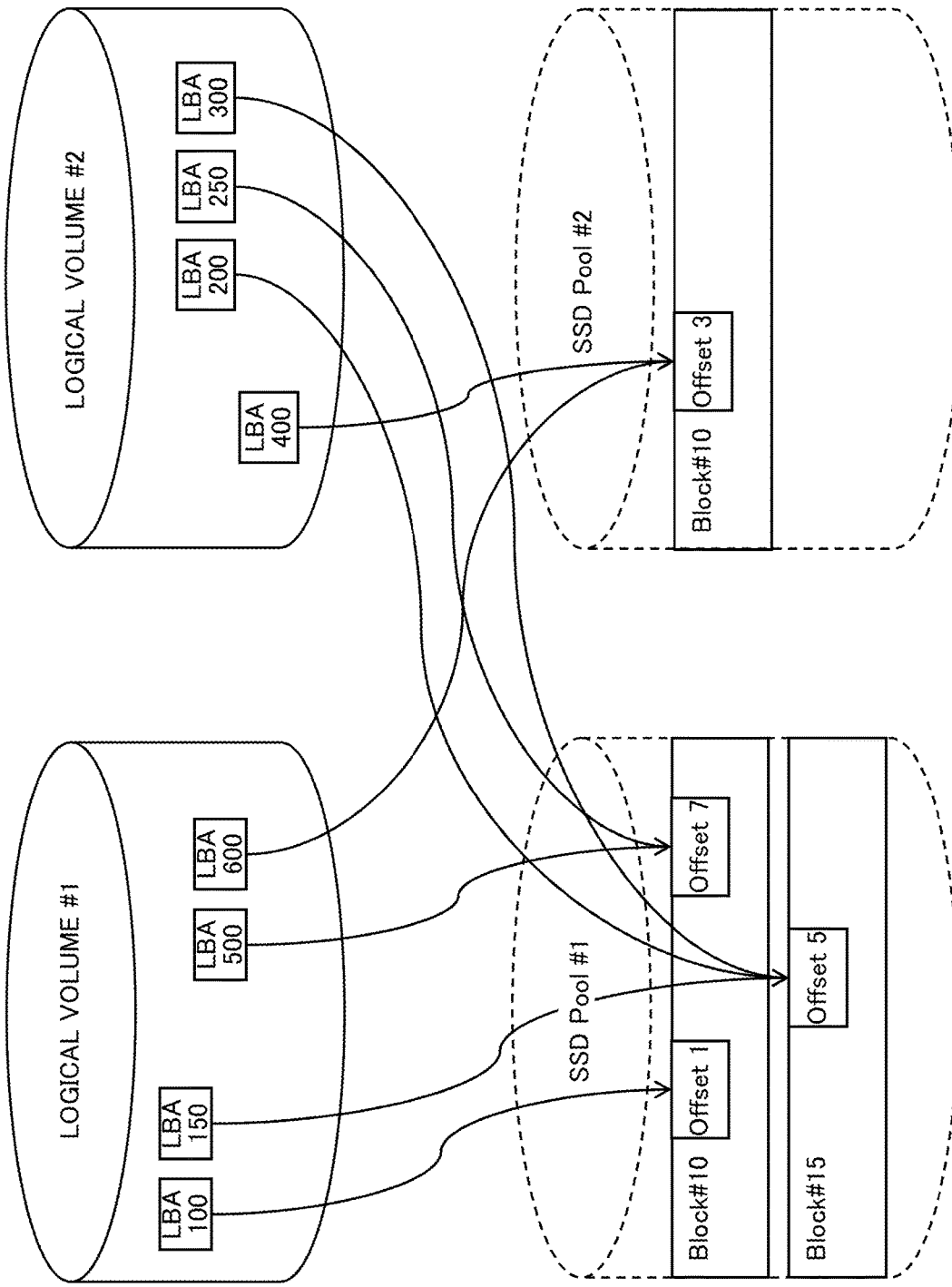
FIG. 18 is a diagram depicting a specific example of mapping with the mapping table depicted in FIG. 17.

Now, FIG. 18 is a diagram depicting a specific example of mapping with the mapping table 120A depicted in FIG. 17, which conceptualizes mapping with the mapping table 120A depicted in FIG. 17.

Figure 16:
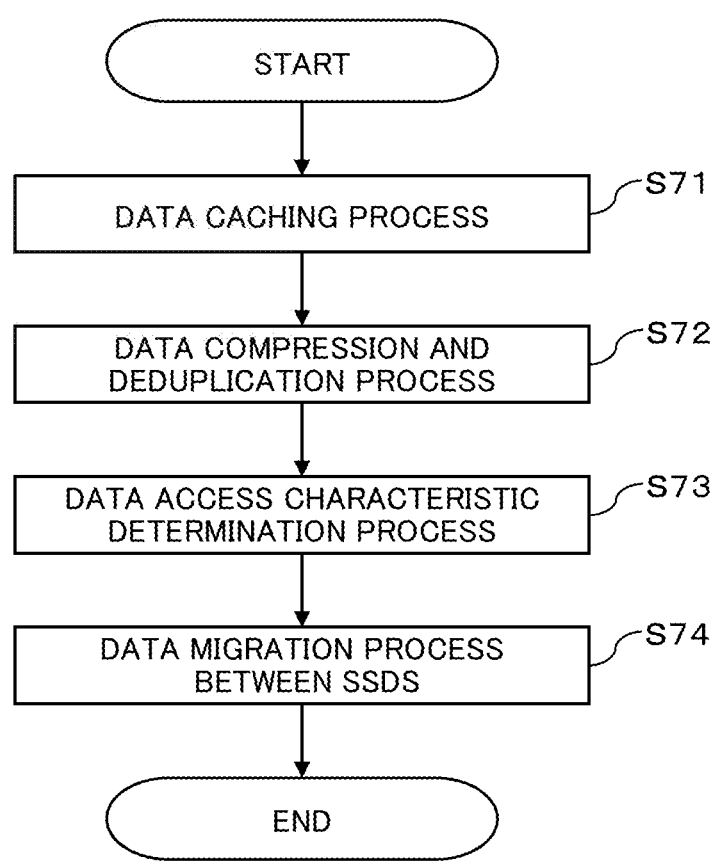
FIG. 16 is a flowchart illustrating a data write process in the storage apparatus including the storage control apparatus depicted in FIG. 15.

Next, similarly to the first embodiment, the data access characteristic determination process in Step S73 in FIG. 16 includes an interval time adjustment process and a migration data extraction process. Similarly to the first embodiment, the interval time adjustment process of the second embodiment is a process to adjust the time interval at which the data access characteristic determining processor 114 operates. Because processes similar to the processes described above with reference to FIGS. 9 and 10 are executed also in interval time adjustment process of the second embodiment, descriptions therefor are omitted.

Figure 19:
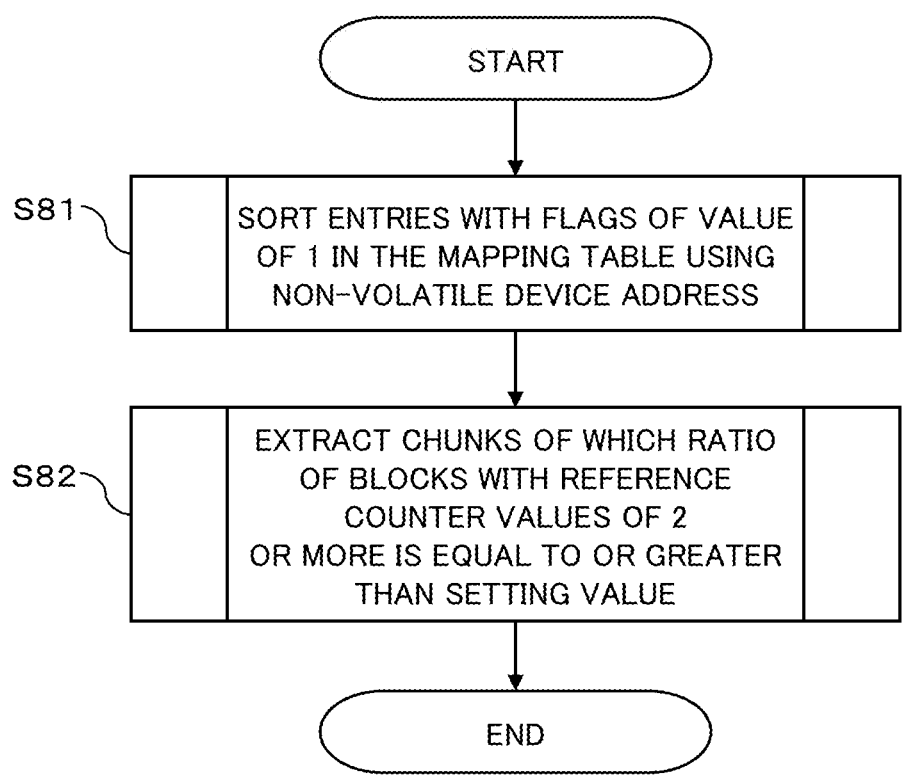

Note that, in the second embodiment, in place of the processes of the first embodiment depicted in FIGS. 11-13, processes depicted in FIGS. 19 and 20 are executed as the migration data extraction process in FIG. 10. In other words, in the migration data extraction process of the second embodiment, a process to extract data blocks to be migrated from the larger-DWPD SSD pool to the smaller-DWPD SSD pool is executed by the data access characteristic determining processor 114.

Next, referring to the flowcharts depicted in FIGS. 19 and 20, the migration data extraction process by the storage control apparatus 10A in the second embodiment will be described.

Initially, referring to the flowchart (Steps S81 and S82) depicted in FIG. 19, an overall flow of the migration data extraction process by the storage control apparatus 10A in the second embodiment will be described. Because a migration of data blocks is a migration between the longer-lifetime SSDs 21 and the shorter-lifetime SSDs 22 (refer to Step S74 in FIG. 16) in the second embodiment, migration-target data blocks are extracted in a unit of chunk.

The migration data extraction process of the second embodiment includes two processes (Steps S81 and S82) depicted in FIG. 19. In the first process (Step S81), entries with flags of a value of one, i.e., data blocks stored in the longer-lifetime SSDs 21 are sorted in the order of chunk using the non-volatile device address as a key, in the mapping table 120A.

After the sort process in Step S81, the characteristic determining processor 114 checks the reference counter value of each entry. The characteristic determining processor 114 then extracts chunks of which the ratio of data blocks corresponding to entries having reference counter values of two or more is equal to or greater than the setting value, as migration-target chunks (Step S82). For example, when a setting value of 100% is set, all data blocks belonging to a migration-target chunk extracted in Step S82 duplicate, in other words, all data blocks will be targets of deduplication.

Referring to the flowchart (Steps S91-S95) depicted in FIG. 20, the extraction process of chunks of which the ratio of data blocks with reference counter values of two or more is equal to or greater than the setting value, executed in Step S82 in FIG. 19, will be described.

Initially, the sort result in Step S81 is referenced to, and the first chunk to be checked is selected (Step S91). Then, it is determined whether or not the ratio of data blocks with reference counter values of two or more among data blocks in the selected chunk is equal to or greater than the setting value (Step S92).

When the ratio of data blocks with reference counter values of two or more is less than the setting value (the NO route from Step S92), it is determined whether or not all of the chunks have been checked (Step S94). When all of the chunks have been checked (the YES route from Step S94), the extraction process ends. In contrast, when not all of the chunks have been checked (the NO route from Step S94), the next unchecked chunk is selected (Step S95), and the characteristic determining processor 114 returns to the process in Step S92.

When the ratio of data blocks with reference counter values of two or more is equal to or greater than the setting value (the YES route from Step S92), the characteristic determining processor 114 registers the currently selected chunk as migration chunk (migration-target chunk) (Step S93), and transitions to the process in Step S94.

Finally, in a data migration process between the SSDs 21 and 22 in Step S74 in FIG. 16, a process to migrate migration chunks extracted and registered in Step S73 in FIG. 16 in the data access characteristic determination process (refer to the process in FIG. 20), from the larger-DWPD SSDs 21 to the smaller-DWPD SSDs 22, is executed.

In the process to migrate the chunks, the following three processes are requested to the SSD pool manager 116. The first process is a process to copy data blocks in a migration-origin chunk to a migration-destination chunk. The second process is a process to invalidate the migration-origin chunk area. The third is a process to replace the contents in non-volatile device addresses in the mapping table 120A, with new addresses in the migration destination, after the preceding two processes complete.

As set forth above, in the storage control apparatus 10A in the second embodiment, a migration of read-intensive data blocks from the larger-DWPD SSD pool to the smaller-DWPD SSD pool is carried out in a unit of chunk on the basis of the reference counter values managed in the deduplication process. This enables optimal data storages to the SSDs 21 and 22 having different life time indicators (DWPDs) in accordance with the access characteristic of data blocks (whether they are read intensive or write intensive), and particularly enables to extend life times of the smaller-DWPD SSDs 22.

Further, in accordance with the second embodiment, because no SCM that is provided in the first embodiment is used, the advantages and effects equivalent to those of the first embodiment can be achieved in the configuration less expensive than that of the first embodiment.

(4) Miscellaneous

While preferred embodiments of the present invention have been described in detail, the present invention is not limited to such particular embodiments and the present invention may be practiced in various modifications and variations without departing from the spirit thereof.

For example, two types of SSDs having a larger and smaller (longer and shorter) life time indicators (i.e., DWPDs) have been described in the aforementioned embodiments, the present invention is not limited to those cases and is similarly applicable to a case in which three or more types of SSDs are used. In such a case, advantages and effects similar to those in the aforementioned embodiments can be achieved.

The life times of storing units can be extended.

All examples and conditional language provided herein are intended for the pedagogical purposes of aiding the reader in understanding the invention and the concepts contributed by the inventor to further the art, and are not to be construed as limitations to such specifically recited examples and conditions, nor does the organization of such examples in the specification relate to a showing of the superiority and inferiority of the invention. Although one or more embodiments of the present inventions have been described in detail, it should be understood that the various changes, substitutions, and alterations could be made hereto without departing from the spirit and scope of the invention.

What is claimed is:

1. A storage apparatus comprising:
a plurality of storing units have different life times; and
a processor configured to manage a data block to be stored in the plurality of storing units, wherein the processor is configured to:
determine an access characteristic of the data block having a reference count for the data block of two or more as read intensive, the reference count being managed by a deduplication function to deduplicate the data block, and
based upon the data block having the reference count of two or more, store the data block in a storing unit having a life time shorter than the other storing unit, among the plurality of storing units having the different life times.

2. The storage apparatus according to claim 1, wherein the processor is configured to:
infer the access characteristic of a data block with the access characteristic of not being read intensive, as write intensive, and
store the data block with the access characteristic of not being read intensive, in a storing unit having a life time longer than the other storing unit, among the plurality of storing units having the different life times.

3. The storage apparatus according to claim 2, wherein the storage apparatus comprising a temporary storing unit configured to temporarily store a write-target data block from a host to the plurality of storing units having the different life times, as the data block, and
the processor is configured to:
determine or infer an access characteristic for the data block stored in the temporary storing unit, and
store data block with the access characteristic that is determined as read intensive, from the temporary storing unit to the storing unit having the life time shorter than the other storing unit.

4. The storage apparatus according to claim 3, wherein the processor is configured to:
infer the access characteristic of a data block that has a reference count of one, and for which a certain time duration elapses after the data block has been written, as write intensive, and
store the data block with the access characteristic that is inferred as write intensive, from the temporary storing unit to the storing unit having the life time longer than the other storing unit.

5. A storage apparatus comprising:
a plurality of storing units having different life times; and
a processor configured to manage a data block to be stored in the plurality of storing units, wherein the processor is configured to:
determine or infer whether an access characteristic for the data block is read intensive based on a reference count of the data block, the reference count of the data block being managed by a deduplication function to deduplicate the data block, and
store the data block in a storing unit in accordance with the determined or inferred access characteristic, among the plurality of storing units having the different life times, wherein
the storing unit having a life time longer than the other storing unit, among the plurality of storing units having the different life times, stores a write-target data block from a host to the plurality of storing units having the different life times, as the data block, and
the processor is configured to:
determine or infer an access characteristic for the data block stored in the storing unit having the life time longer than the other storing unit, and
store the data block with the access characteristic that is determined as read intensive, from the storing unit having the life time longer than the other storing unit, to the storing unit having the life time shorter than the other storing unit.

6. A storage control apparatus comprising:
a processor configured to manage a data block to be stored in a plurality of storing units having different life times, wherein the processor is configured to:
determine an access characteristic of the data block having a reference count for the data block of two or more as read intensive, the reference count being managed by a deduplication function to deduplicate the data block, and
based upon the data block having the reference count of two or more, store the data block in a storing unit having a life time shorter than the other storing unit, among the plurality of storing units having the different life times.

7. The storage control apparatus according to claim 6, wherein the processor is configured to:
infer the access characteristic of a data block with the access characteristic of not being read intensive, as write intensive, and
store the data block with the access characteristic of not being read intensive, in a storing unit having a life time longer than the other storing unit, among the plurality of storing units having the different life times.

8. The storage control apparatus according to claim 7, wherein
the storage apparatus comprising a temporary storing unit configured to temporarily store a write-target data block from a host to the plurality of storing units having the different life times, as the data block, and
the processor is configured to:
determine or infer an access characteristic for the data block stored in the temporary storing unit, and
store data block with the access characteristic that is determined as read intensive, from the temporary storing unit to the storing unit having the life time shorter than the other storing unit.

9. The storage control apparatus according to claim 8, wherein the processor is configured to:

infer the access characteristic of a data block that has a reference count of one, and for which a certain time duration elapses after the data block has been written, as write intensive, and store the data block with the access characteristic that is inferred as write intensive, from the temporary storing unit to the storing unit having the life time longer than the other storing unit.

10. A storage control apparatus comprising:

a processor configured to manage a data block to be stored in a plurality of storing units having different life times, wherein the processor is configured to:

determine or infer whether an access characteristic for the data block is read intensive based on a reference count of the data block, the reference count of the data block being managed by a deduplication function to deduplicate the data block, and store the data block in a storing unit in accordance with the determined access characteristic, among the plurality of storing units having the different life times, wherein the storing unit having a life time longer than the other storing unit, among the plurality of storing units having the different life times, stores a write-target data block from a host to the plurality of storing units having the different life times, as the data block, and the processor is configured to:

determine or infer an access characteristic for the data block stored in the storing unit having the life time longer than the other storing unit, and store the data block with the access characteristic that is determined as read intensive, from the storing unit having the life time longer than the other storing unit, to the storing unit having the life time shorter than the other storing unit.

* * * * *